(12) United States Patent
Matsumoto et al.

(10) Patent No.: US 7,898,759 B2
(45) Date of Patent: Mar. 1, 2011

(54) THERMALLY ASSISTED MAGNETIC RECORDING HEAD AND MAGNETIC RECORDING APPARATUS

(75) Inventors: Takuya Matsumoto, Hachioji (JP); Junichiro Shimizu, Hino (JP)

(73) Assignee: Hitachi, Ltd., Tokyo (JP)

( * ) Notice: Subject to any disclaimer, the term of this patent is extended or adjusted under 35 U.S.C. 154(b) by 392 days.

(21) Appl. No.: 12/015,528

(22) Filed: Jan. 17, 2008

(65) Prior Publication Data

US 2008/0204916 A1 Aug. 28, 2008

(30) Foreign Application Priority Data

Feb. 22, 2007 (JP) .............................. 2007-042486

(51) Int. Cl.
*G11B 5/02* (2006.01)
(52) U.S. Cl. .......................................... 360/59; 360/75
(58) Field of Classification Search ........................ None
See application file for complete search history.

(56) References Cited

U.S. PATENT DOCUMENTS

| | | | | |
|---|---|---|---|---|
| 5,199,090 | A * | 3/1993 | Bell | 385/33 |
| 7,519,257 | B2 * | 4/2009 | Lipson et al. | 385/126 |
| 2006/0233061 | A1 * | 10/2006 | Rausch et al. | 369/13.32 |
| 2007/0159718 | A1 * | 7/2007 | Kim et al. | 360/125 |
| 2008/0055784 | A1 * | 3/2008 | Shimazawa et al. | 360/313 |

FOREIGN PATENT DOCUMENTS

| JP | 01-271931 | 10/1989 |
|---|---|---|
| JP | 09-180274 | 7/1997 |
| JP | 2003-045004 | 2/2003 |
| JP | 2004-151046 | 5/2004 |

OTHER PUBLICATIONS

Hideki Saga, et al., New Recording Method Combining Thermo-Magnetic Writing and Flux Detection, Japanese Journal of Applied Physics, Mar. 1999, pp. 1839-1840, vol. 38 Part 1.
Kenji Kato, et al, Signal Readout Using Small Near-Field Optical Head with Horizontal Light Introduction Through Optical Fiber, The Japan Society of Applied Physics, Aug. 2003, pp. 5102-5106, vol. 42 Part 1.
Edward Gage, et al. Integration Challenges for Hear Assisted Magnetic Recording Data Storage, Technical digest of Magneto-optical Recording Internal Symposium pp. 2, 2006.
T. Matsumoto et al, Writing 40nm Marks by Using a Beaked Metallic Plate Near-Field Optical Probe, Optical Society of America, 2006, p. 259, vol. 31, Tokyo, Japan.

* cited by examiner

*Primary Examiner*—Jason C Olson
(74) *Attorney, Agent, or Firm*—Antonelli, Terry, Stout & Kraus, LLP.

(57) ABSTRACT

A second waveguide is formed near a first waveguide for guiding light to the vicinity of a main pole of a thermally assisted magnetic recording head, and a portion of light propagated through the waveguide 1 is branched to the second waveguide. The light transmitting in the second waveguide is detected by a photodetector to detect an intensity of the light propagated through the first waveguide. In the magnetic recording apparatus, an intensity of a semiconductor laser is decreased when an amount of light incident to the photodetector is large and the intensity of the semiconductor laser is increased when the amount of light incident to the photodetector is small. By constituting a feedback loop as described above, the intensity of the light propagated through the first waveguide is kept constant.

1 Claim, 29 Drawing Sheets

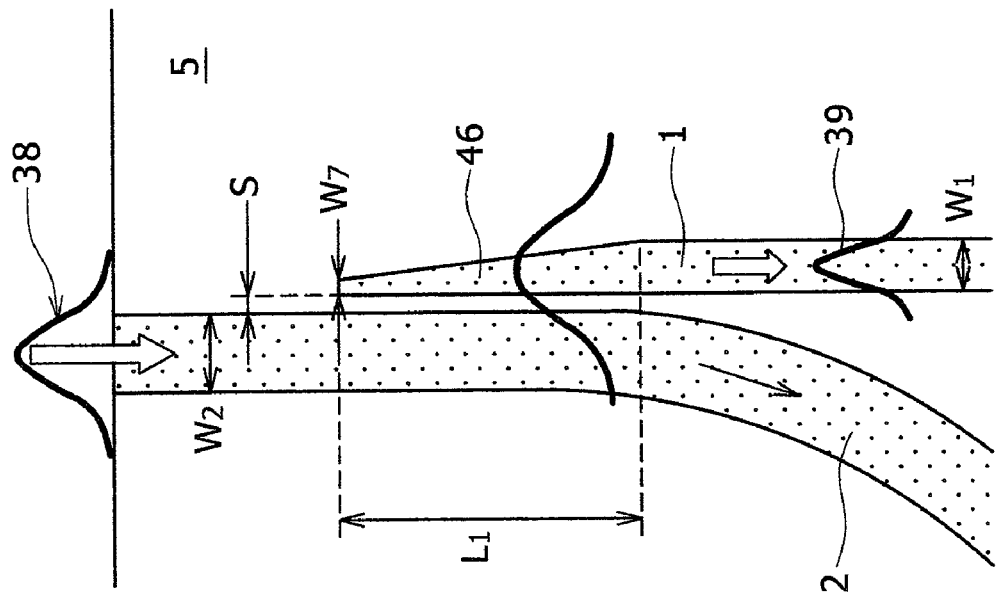
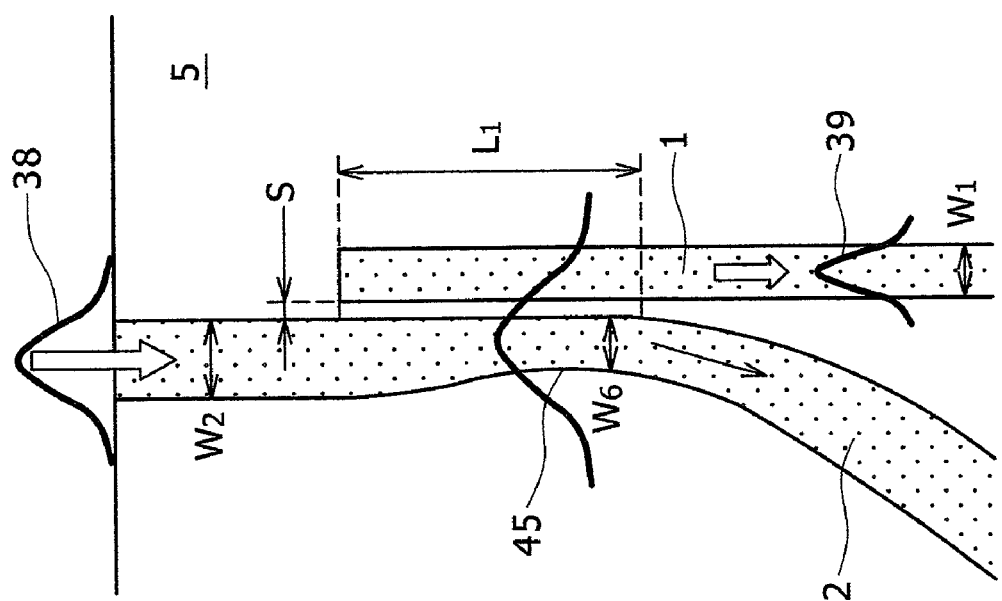

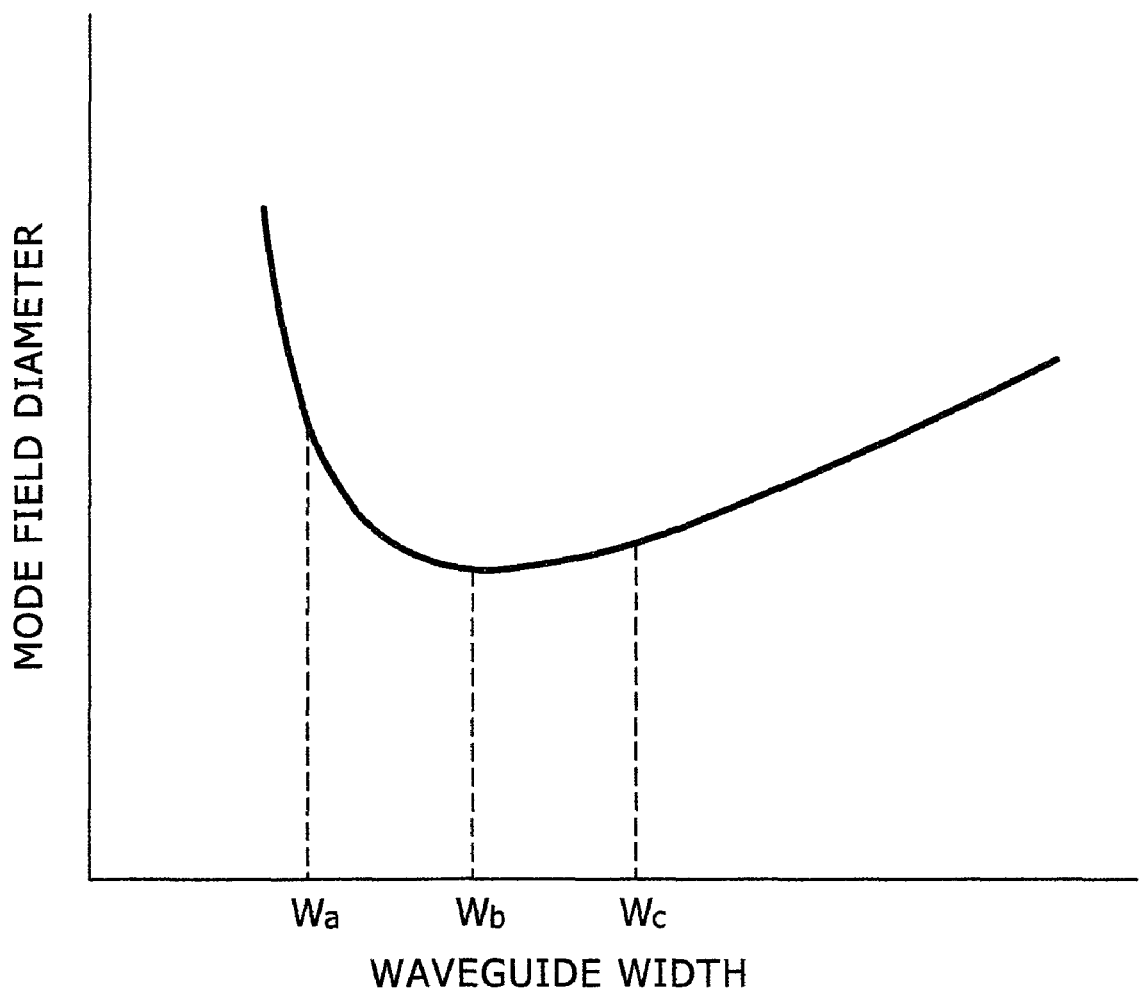

THERMALLY ASSISTED MAGNETIC RECORDING HEAD AND MAGNETIC RECORDING APPARATUS

CLAIM OF PRIORITY

The present application claims priority from Japanese application JP 2007-042486, filed on Feb. 22, 2007, the content of which is hereby incorporated by reference into this application.

BACKGROUND OF THE INVENTION

1. Field of the Invention

The present invention relates to a thermally-assisted magnetic recoding head and a magnetic recording apparatus.

2. Description of the Related Art

In recent years, a thermally assisted magnetic recording system has been proposed as a recording system for attaining a recording density of 1 Tb/in$^2$ or more (refer to H. Saga, H. Nemoto, H. Sukeda, and M. Takahashi, Jpn. J. Appl. Phys. 38, Part 1, pp 1839 (1999)). In the existent magnetic recording apparatus, when the recording density exceeds 1 Tb/in$^2$, this results in a problem of erasing recorded information by thermal fluctuation. In order to prevent this, it is necessary to increase the coercivity of a magnetic recoding medium. However, since the magnitude of magnetic fields that can be generated from a recording head is limited, recording bits cannot be formed to the medium if the coercivity is increased excessively. For overcoming the problem, in the thermally-assisted recoding system, a medium is heated by light to lower the coercivity at the instance of recording. This enables recording to a high coercivity medium to attain a recording density of 1 Tb/in$^2$ or more.

In the thermally-assisted magnetic recoding system, it is necessary to heat the vicinity of a magnetic pole for applying a magnetic field by light. Therefore, for instance, a waveguide is formed to the magnetic pole and light of a semiconductor laser as a light source is introduced near the top end of the magnetic pole. In this case, a semiconductor laser is mounted on a flying slider or placed at the base of a suspension, and light is guided therefrom to a flying slider using a waveguide such as an optical fiber (refer to Kenji Kato, et al., Jpn. J. Appl. Phys. Vol. 42, pp 5102-5106 (2003)).

Further, a semiconductor laser may be placed on a suspension, and light thereof may be propagated as free wave propagation light and the light may be coupled to a waveguide by using a grating coupler (refer to Edward Gage et al., Technical Digest of Magneto-Optical Recording Internal Symposium 2006, p 2 (2006)).

In the thermally assisted magnetic recording apparatus, the semiconductor laser for irradiation of light is disposed on a suspension or an arm situated at the base thereof, or on a flying slider. In a case of placing the semiconductor laser on the suspension or the arm, light emitting from the semiconductor laser is guided through a waveguide or as free wave propagation light into the slider. In a case of guiding the light through the waveguide, the intensity of the light transmitting through the waveguide changes due to external disturbances such as vibrations or temperature fluctuation applied to the waveguide connecting the semiconductor laser and the slider. As a result, the intensity of light reaching the slider is changed. Further, in a case of guiding the light as free wave propagation light as far as the slider and coupling the propagated light by way of a grating coupler with the waveguide formed on the side of the magnetic pole, the ratio that the propagated light couples the waveguide formed to the side of the magnetic pole (coupling efficiency) depends on an incident angle of light that is incident to the grating. Accordingly, when the slider or the suspension vibrates, since the direction of the light incident to the grating changes, the coupling efficiency to the waveguide changes and, as a result, the intensity of the light transmitting through the waveguide formed on the side of the magnetic pole fluctuates. Further, in a case of using the grating coupler, the coupling efficiency to the waveguide also depends on the wavelength. If the temperature fluctuates, since the wavelength of light of the semiconductor laser fluctuates, the coupling efficiency changes. As a result, the intensity of the light transmitting through the waveguide formed on the side of the magnetic pole changes.

In a case of placing the semiconductor laser on the flying slider, for coupling the emission light from the semiconductor laser to the waveguide formed on the side of the magnetic pole, the semiconductor laser is disposed such that the emission end of the semiconductor laser is in contact with the incident end of the waveguide. Alternatively, the emission light from the semiconductor laser is condensed by a micro lens placed on the slider and the incident end of the waveguide is positioned to the focal point thereof thereby introducing the light into the waveguide. In this case, the amount of the light transmitting through the waveguide may possibly change by the following factors:

(1) Due to the degradation of an adhesive or solder that fixes the semiconductor laser or the micro lens, the position for the semiconductor laser or the micro lens is displaced during long time use to change the coupling efficiency between the waveguide and the incident light.

(2) Thermal deformation is caused to the slider or the optical element due to the heat generated from the semiconductor laser or the heat generated in the drive, to change the coupling efficiency between the waveguide and the incident light.

(3) For increasing the coupling efficiency between the waveguide and the incident light, the diameter for the light distribution in the waveguide is preferably made about equal with the spot diameter of the incident light. The diameter of the mode field means the width of the intensity distribution of the light in the waveguide. Usually, the diameter of the light spot at the emission end of the semiconductor laser is several μm. Even when this is condensed by a lens, it can only be restricted to about 1 to 2 μm due to the limit of diffraction. Accordingly, it is preferred to increase diameter of the mode field to about 1 to 2 μm. On the other hand, in the thermally assisted magnetic recording, it is preferred that the diameter of the light spot is decreased about to the same extent as the recording bit. If the diameter of the light spot is larger than the recording bit, an adjacent bit is heated to erase the recording bit thereof. For overcoming the problem of erasing the adjacent bit, a micro light spot is generated by utilizing an optical near-field generator. For example, an optical near-field generator such as a metal scatterer of a trigonal shape is disposed at the emission end of the waveguide in the slider (refer to T. Matsumoto, et al., Optics Letter, Vol. 31, P 259, (2006)). In this case, for enhancing the efficiency of generating the near-field light, it is preferred to make the spot diameter of light incident to the optical near-field generator as small as possible. That is, it is preferred to make the diameter of the mode field in the waveguide as small as possible. As a method of satisfying the requirement described above, there may be considered a method of making the width of the waveguide larger at the inlet of the waveguide, which is made gradually smaller as it approaches the optical near-field generator. In this case, since the width is large at the inlet of the waveguide, there may be a possibility that higher order propagation modes as well as fundamental mode is also excited. If the higher order modes are excited, the higher order modes and the fundamental mode cause interference in the waveguide. Then, distribution of the light intensity in the waveguide changes due to external disturbance such as temperature. As a result, the intensity of the light transmitting through a narrowed portion of the waveguide fluctuates.

While descriptions have been made to the fluctuation of the light intensity due to the external disturbances such as temperature change or vibrations, the light intensity changes also by the aging degradation of the semiconductor laser. If the intensity of the light incident to the surface of the medium fluctuates due to the external disturbances such as temperature change or vibrations, or the aging degradation of the semiconductor laser, the heating temperature of the medium changes. As a result, the recording condition changes on every time and stable recording is no longer possible (bit error rate increase).

SUMMARY OF THE INVENTION

The present invention intends to provide a thermally assisted magnetic recording head capable of detecting the change of the light intensity due to the external disturbances such as temperature change or vibrations, or the aging deterioration of the light source.

The invention further intends to decrease the change of the light intensity due to external disturbances such as temperature change or vibrations, or aging deterioration of the light source in a thermally assisted magnetic recording apparatus in which a light source is disposed to the outside of a flying slider, and the light source and the flying slider are coupled by a waveguide or free wave propagation light, or in a thermally assisted magnetic recording apparatus in which a light source is disposed on a slider.

In the thermally assisted magnetic recording head of the invention, a second waveguide is formed near a first waveguide for guiding light to the vicinity of a main pole and a portion of the light propagated through the first waveguide is branched to the second waveguide. Then, light transmitting through the second waveguide is detected by a photodetector.

In the magnetic recording apparatus having the thermally assisted magnetic recording head mounted thereon, the output of the semiconductor laser is decreased when the amount of light incident to the photodetector is large, while the output of the semiconductor laser is increased when the amount of light incident to the photodetector is small. By constituting a feedback loop as described above, the intensity of the light propagated in the first waveguide is kept constant.

In the thermally assisted magnetic recording head, a core of the first waveguide for guiding light to the vicinity of the main pole and a core of the second waveguide used for detection are arranged such that the distance between them is at or less than the light wavelength. In this case, since the evanescent light on the surface of the first core is coupled to the second waveguide, the light moves from the first waveguide to the second waveguide.

When the moving ratio of the light from the first waveguide to the second waveguide (coupling efficiency) is excessively large, the rising temperature on the surface of the medium lowers. It is preferred to restrict the coupling efficiency to 33% or less for making the rising temperature to 200° C. or higher and restrict the coupling efficiency to 16% or less for making it 250° C. or higher.

A reflection structure for bending the optical channel is preferably formed between the second waveguide and the photodetector. Thus, the photodetector can be disposed on the upper surface of the slider. For bending the optical channel, total reflection caused on the surface of dielectrics, or a metal reflection film or a reflection block is utilized. Alternatively, the light may be guided to the photodetector by forming the shape of the second waveguide into an arcuate shape.

If reflection light formed at the emission end of the first waveguide or scattered light formed from an optical near field generator disposed at the emission end of the first waveguide is coupled to the second waveguide and reflected at the end on the inlet of the second waveguide, noises are introduced to the photodetector. In order to prevent this, the end on the inlet of the second waveguide is preferably cut obliquely. Alternatively, an anti-reflection film formed of a multi-layer dielectric film may be formed at the end on the inlet of the second waveguide.

If the diameter of the mode field of the first waveguide is smaller than the spot diameter for incident light, a portion of the incident light leaks to the periphery of the waveguide as leaked light. The diameter of the mode field means a width of the intensity distribution of the light in the waveguide. In order to prevent the leaked light from entering to the second waveguide, a shield structure is preferably disposed to an upper portion of the second waveguide. As the shield structure, a metal film or a metal block, or a prism formed of dielectrics is utilized. In a case of utilizing the prism, the leaked light is bent in a direction perpendicular to the waveguide by total deflection or refraction.

A tapered portion may be disposed at the end on the light incident side of the first waveguide for enhancing the coupling efficiency between the incident light and the waveguide. In this case, since higher order modes are excited at a portion where the width of the waveguide is enlarged to cause interference with the fundamental mode, optical power in the waveguide fluctuates. However, fluctuation of the optical power can be suppressed by constituting a feedback loop such that the second waveguide is disposed near the narrowed portion of the first waveguide situated on the side nearer to the medium, and the light coupled to the second waveguide is detected by a photodetector to make the optical power constant in the waveguide.

Instead of introducing the incident light directly to the first waveguide for guiding the light to the vicinity of the main pole, the incident light may also be guided to the second waveguide for monitoring the amount of the light. In this case, by making the width for the core of the second waveguide larger than the width for the core of the first waveguide, the entire efficiency (ratio between the energy of light at the inlet of the waveguide and the energy of the near field light) can be made larger than that in the case of introducing the incident light directly to the first waveguide. That is, in a case of coupling the incident light to the second waveguide, the coupling efficiency of the incident light to the second waveguide is increased as the diameter of the mode field of the second waveguide is nearer to the diameter for the incident light. On the other hand, the near field light generation efficiency is enhanced more as the diameter of the mode field of the first waveguide is smaller. Accordingly, the coupling efficiency of the incident light to the second waveguide is enhanced by making the width for the second waveguide larger such that the diameter of the mode field of the second waveguide approaches the diameter of the incident light. Then, in a case of transferring the light by way of the evanescent light from the second waveguide to the first waveguide of a smaller width, the light can be guided efficiently to the first waveguide of a smaller width. That is, the entire efficiency can be increased.

In a case of introducing light to the second waveguide, for improving the coupling efficiency from the second waveguide to the first waveguide, the width for the second waveguide is narrowed in a portion where the two waveguides are coupled. Alternatively, the width for the first waveguide is narrowed, or the widths for both of the first and the second waveguides are preferably narrowed. In this case, for the relation between the diameter of the mode field of the waveguide and the width for the waveguide, it is set such that the width for one of the narrowed portions is $W_{min}$ or less assuming the width where the diameter of the mode field is reduced to minimum as: $W_{min}$. As described above, in a case of narrowing the width, the diameter of the mode field of the waveguide is enlarged in the narrowed portion and the exuding depth of the evanescent light exuding to the core surface is increased. As a result, light exudes more on the other side of the waveguide and, as a result, the coupling efficiency is improved.

Scattered light generated from a device that generates near-field light disposed at the emission portion of the first waveguide may also be detected by disposing the photodetector at the end of the inlet of the second waveguide. By detecting the scattered light as described above, data recorded in the medium can be read.

It may also be adapted such that the light transferring from the first waveguide to the second waveguide proceeds in the opposite direction through the second waveguide by disposing a reflection mirror in the direction of the exit of the second waveguide (in the proceeding direction of the light transferring from the first waveguide to the second waveguide), and the light may be detected by a photodetector disposed at the end of the inlet of the second waveguide. In this case, light transferring from the first waveguide to the second waveguide and scattered light generated from the optical near field generator disposed to the emission portion of the first waveguide are detected simultaneously by the photodetector. This may be prevented by disposing a ¼ wave plate before the reflection mirror disposed in the direction of the exit of the second waveguide thereby rotating the polarizing direction of the light transferring from the first waveguide to the second waveguide by 90°. With such a constitution, since the direction of polarization of the light transferring from the first waveguide to the second waveguide and the polarization direction of the scattered light generated from the optical near-field generator are perpendicular to each other, they can be separated by a polarization beam splitter.

As described above, for detecting the amount of the light in the first waveguide, instead of disposing the second waveguide near the first waveguide and transferring the light in the first waveguide by way of the evanescent light to the second waveguide, a structure for scattering the light may be disposed on the surface of the core of the first waveguide to scatter the light in the first waveguide and the light may be detected.

The semiconductor laser as a light source may be disposed to an upper portion of a slider, or on a suspension, or an arm. In a case of disposing the semiconductor laser on the suspension or the arm, the light is guided from the semiconductor laser to the slider through the waveguide or by free wave propagation. In a case of guiding the light by free wave propagation, the propagated light and the waveguide in the slider are coupled by using a grating. As described above, fluctuation of the amount of the light formed in the case of guiding through the waveguide or by free wave propagation can be suppressed by detecting the amount of the light coupled to the second waveguide and adjusting the intensity of the light source based on the intensity.

According to the invention, in the thermally assisted magnetic recording head, fluctuation of the light intensity due to external disturbances such as temperature change or vibrations, or aging deterioration of the light source such as a semiconductor laser can be detected. Further, in a thermally assisted magnetic recording apparatus in which a light source such as a semiconductor laser is disposed to the outside of a flying slider and the light source and a flying slider are coupled through a waveguide or by free wave propagation, or in a thermally assisted magnetic recording apparatus in which the light source is disposed on the slider, fluctuation of the light intensity due to external disturbances such as temperature change or vibrations, or aging deterioration of the light source can be decreased and, as a result, stable recording can be attained.

DESCRIPTION OF THE ACCOMPANYING DRAWINGS

FIGS. 3A and 3B are views showing the entire constitution of a thermally assisted magnetic recording head according to the invention in which FIG. 3A is a cross sectional view, and FIG. 3B is an upper plan view including the entire suspension;

FIGS. 14A to 14C are views showing an example of forming a shield structure above the end on the inlet of the second waveguide in which FIG. 14A shows the case of forming a metal shield film or shield block, FIG. 14B is a view showing a case of totally reflecting leaked light by using a prism, and FIG. 14C is a view for refracting the leaked light by using a prism;

FIGS. 18A and 18B are views showing an example of disposing a tapered portion on the inlet of the first waveguide, in which FIG. 18A shows a case where a width of the tapered portion decreases in an exponential form, and FIG. 18B is a view showing a case where the width of the tapered portion decreases in a parabolic function manner;

FIGS. 20A and 20B are views showing a waveguide structure according to the second embodiment, in which FIG. 20A is a view showing a case of decreasing a portion of the width of the waveguide on the light incident side, and FIG. 20B is a view showing a case of decreasing a portion of the width of the waveguide on the light transforming side;

FIG. 21 is a view showing a relation between the diameter of the waveguide and the diameter of the mode field;

FIGS. 27A and 27B are views showing examples of disposing a semiconductor laser on a slider in which FIG. 27A is a side cross sectional view, and FIG. 27B is a view showing an optical module as viewed on the side at the back of a slider.

PREFERRED EMBODIMENTS OF THE PRESENT INVENTION

Preferred embodiments of the present invention are to be described with reference to the drawings.

Figure 3A:
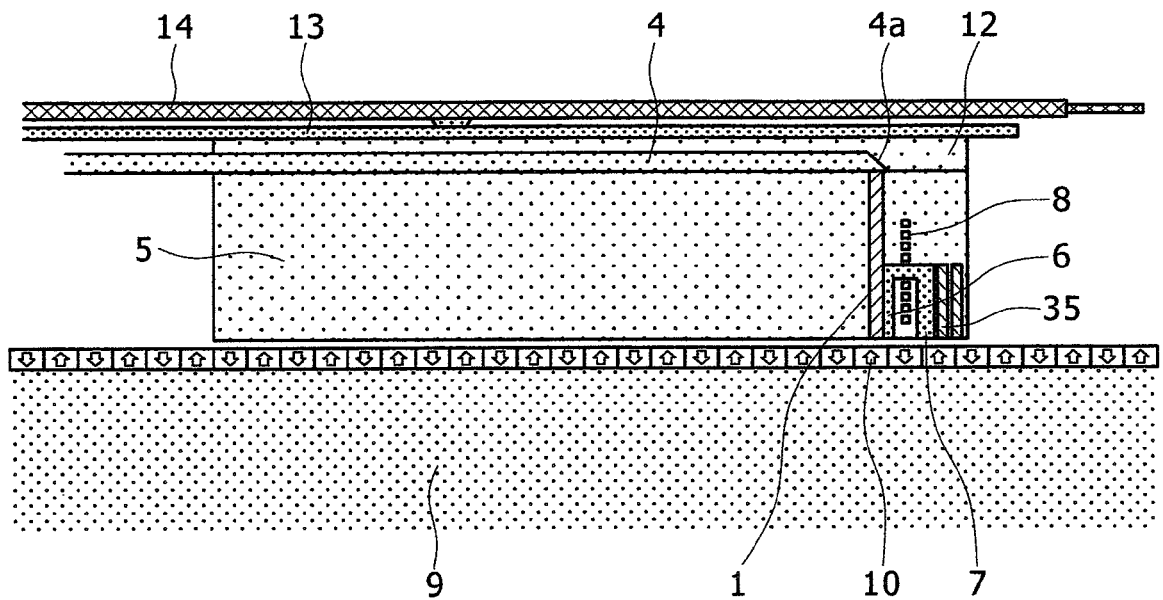
Figure 3B:
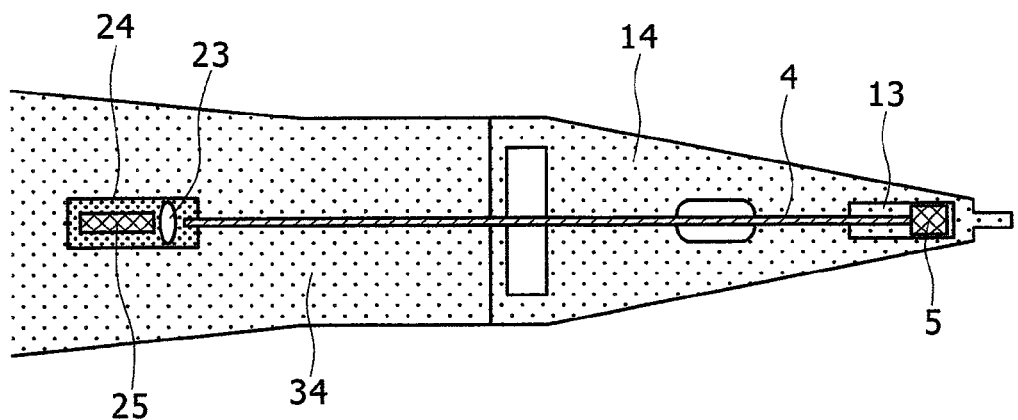

FIGS. 3A and 3B show an entire view of a thermally assisted magnetic recording head according to the invention. FIG. 3A is a side elevational view for a flying slider and FIG. 3B shows an entire view of a suspension and a slider. A semiconductor laser 25 at a wavelength of 780 nm is utilized as a light source and the semiconductor laser 25 is placed on an arm 34 as shown in FIG. 3B. Light generated from the semiconductor laser 25 is guided by utilizing a waveguide 4 to a flying slider 5. As the waveguide 4, an optical fiber formed of an organic waveguide or glass is utilized. A coupling lens 23 is disposed between the semiconductor laser 25 and the waveguide 4 to couple the light from the semiconductor laser to the waveguide 4. The semiconductor laser and the coupling lens are fabricated in a thin package 24. The end 4a of the waveguide 4 on the side opposite to the light source is scraped at 45° such that the optical channel is thereby bent by 90°. A waveguide 1 for guiding light near a main pole 6 is disposed on the side of the main pole 6 for applying a magnetic field (core portion of the waveguide 1 is shown in the drawing). The end 4a of the waveguide 4 is disposed at the incident port of the waveguide 1, so that light from the waveguide 4 is guided to the waveguide 1. An optical near-field generator 15 (refer to FIG. 4) is formed at the emission end of the waveguide 1 for decreasing the size of the optical spot smaller (refer to FIG. 4). Since a minute region of several 10 nm or less can be heated with such a constitution, heating for adjacent bits can be prevented. As described above, when adjacent bits are heated, the adjacent bits may possibly be erased.

Figure 4:
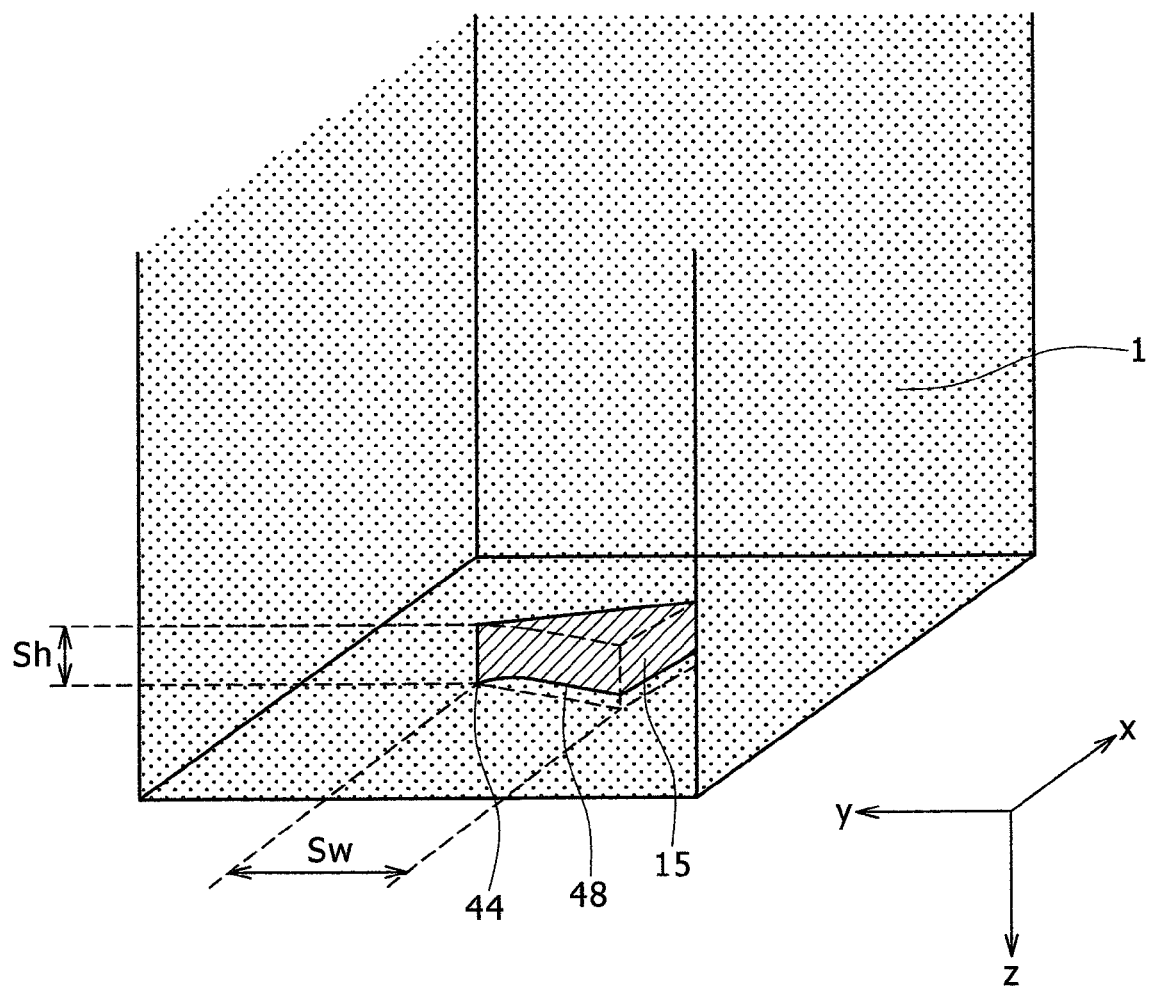
FIG. 4 is a view showing a scatterer for generating near-field light.

As shown in FIG. 4, as the optical near-field generator 15, a metal scatterer of a trigonal shape is utilized. The scatterer sized 50 nm for thickness $S_h$ and 100 nm for length $S_w$. When light is incident such that the polarization direction of light propagating in the first waveguide is directed to the direction y, intense near-field light is generated at an apex 44. For making the spot diameter further smaller, a portion on the surface of the scatterer is scraped at a portion other than the apex 44. By the near-field light generated from the optical near-field generator 15, the surface of the magnetic recording medium 9 can be heated to 150° C. or higher. By supplying a current to coils 8 at the instance of heating, a magnetic field is generated, and the generated magnetic field is guided on the side of the recording medium by utilizing the main pole 6. The direction of the magnetic field is in perpendicular to the surface of the recording medium. In this case, it is necessary to constitute such that the magnetic field generated from the main pole 6 leaks on the side of the waveguide 1 to superpose the distribution of the light and the distribution of the magnetic field at the emission end of the waveguide 1. For this reason, the distance from the end of the main pole 6 to the core center of the waveguide 1 should not be excessively large. Then, the distance from the end of the main pole 6 to the core center of the waveguide 1 is set to 1 μm. With the structure described above, magnetization is reversed in a region where the distribution of the light and the distribution of magnetic field are overlapped. For reading, a magnetic reading device (Giant Magnet Resistive (GMR) device or Tunneling Magneto Resistive (TMR) device) disposed near the main pole 6 is utilized. For the material of the recording layer 10 of the magnetic recording medium 9, FePt, CoPd, CoCrPt, TbFeCo, etc. are used and the direction of magnetization in the recording layer 10 is directed in perpendicular or oblique to the medium surface.

In the embodiment described above, while the magnetic field is generated from coils formed in the flying slider, the magnetic field generation coil may also be disposed to the outside of the slider if the magnetic field necessary for recording is small. For example, a coil formed with a magnetic pole at the center may be disposed on the side opposite to the recording medium.

Figure 1:
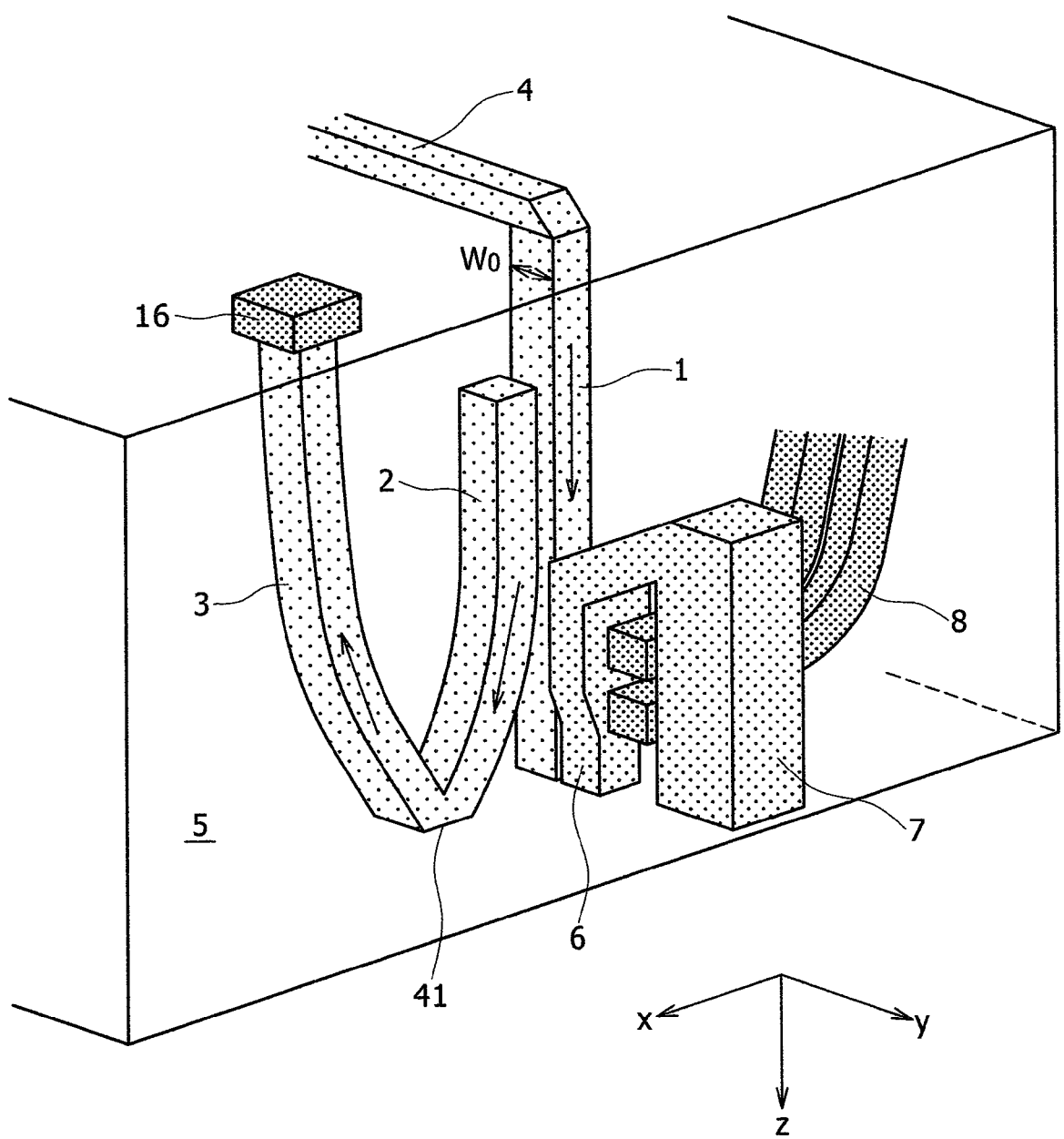
FIG. 1 is a fragmentary perspective view of a thermally assisted magnetic recording head in a first embodiment of the invention.
Figure 2:
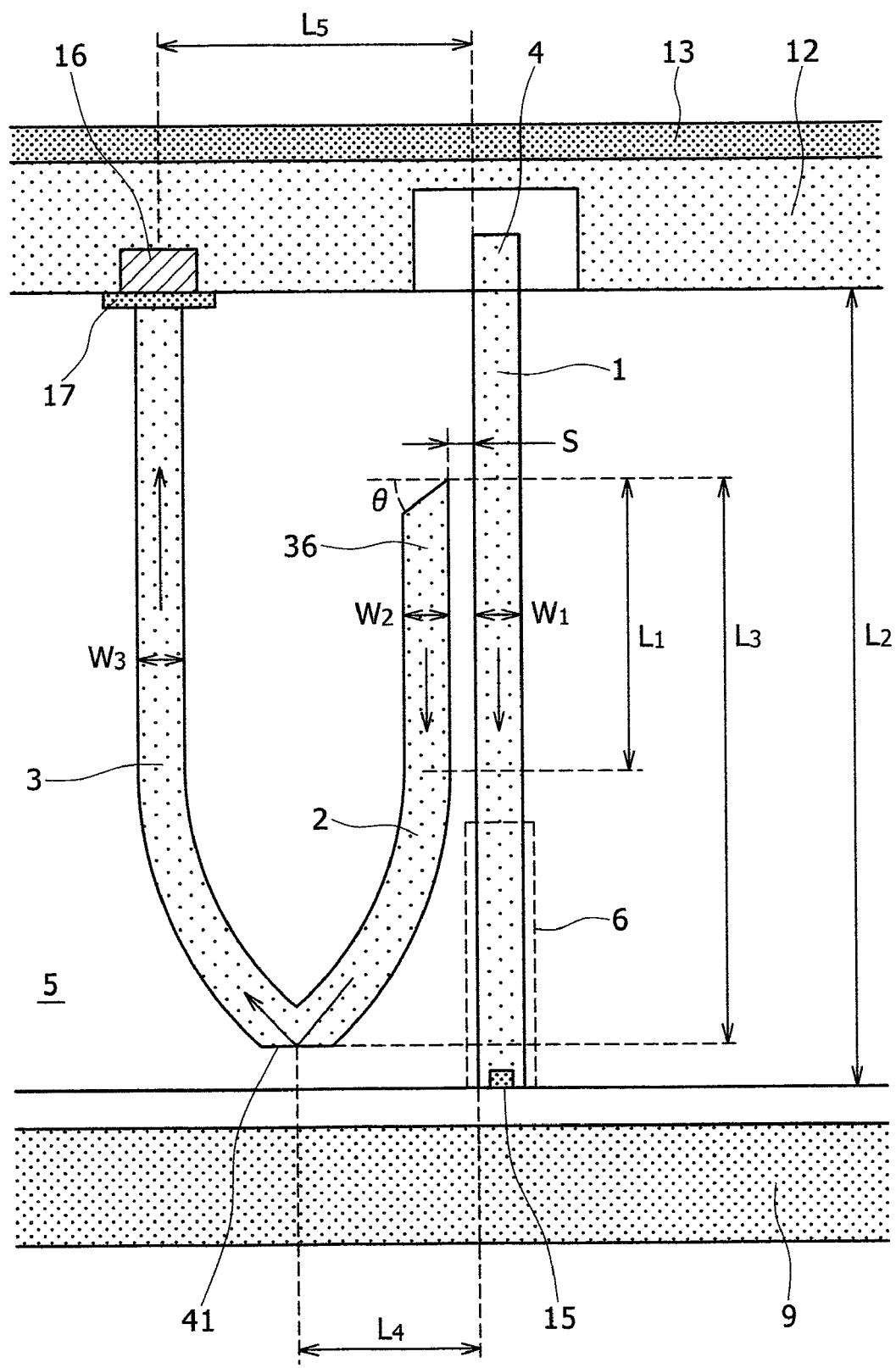
FIG. 2 is a view showing the structure of a waveguide in the first embodiment.
Figure 8:
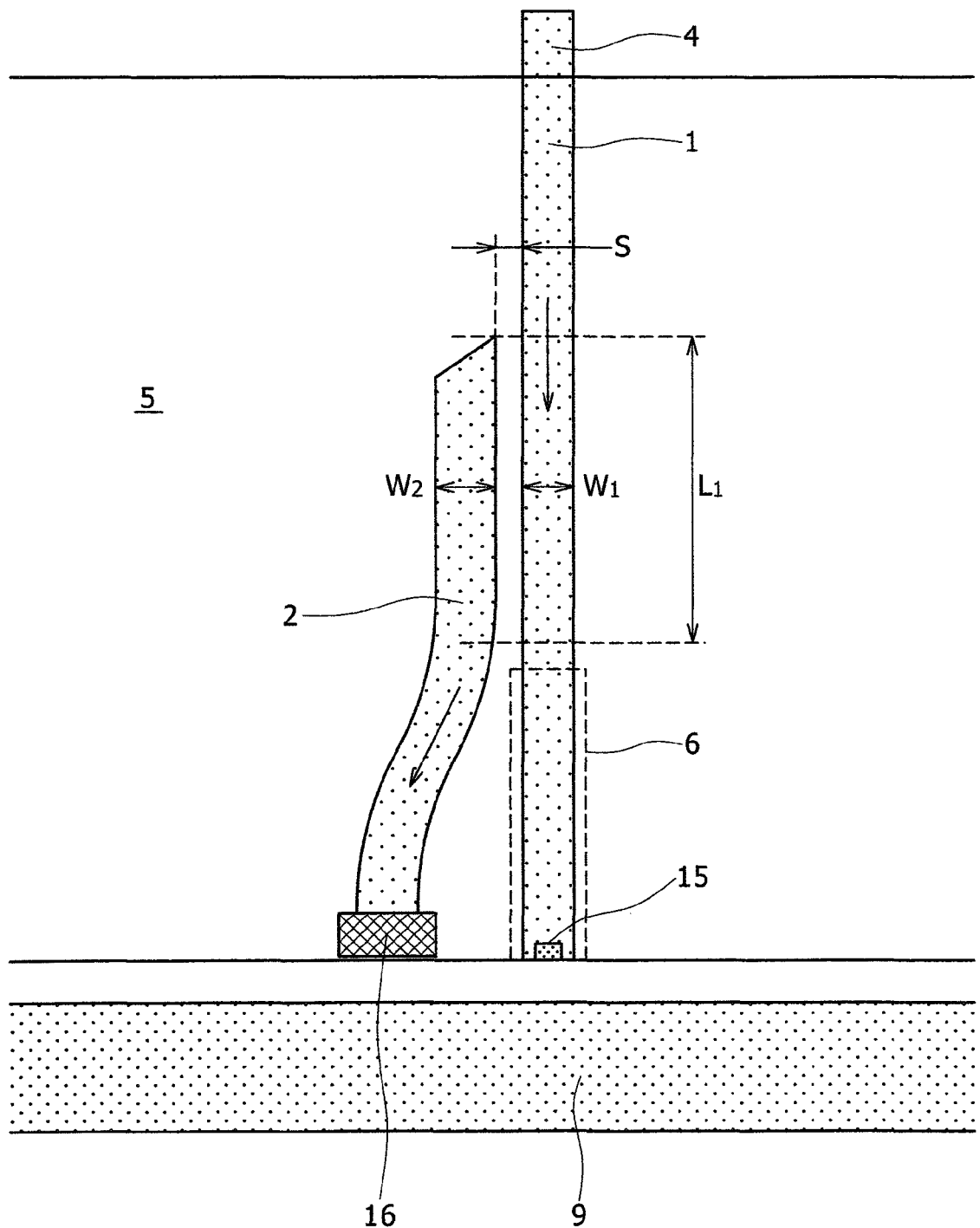
FIG. 8 is a view showing an example of disposing a photodiode to a lower portion of the second waveguide.

Then, the constitution of an optoelectronic conversion device of a thermally assisted magnetic recording head according to the first embodiment is to be described with reference to FIG. 1 and FIG. 2. The entire constitution is as shown in FIGS. 3A and 3B. The intensity of light emitting from the waveguide 4 changes due to vibrations or temperature change. As s result, the intensity of light transmitting through the waveguide 1 also changes. Then, in this embodiment, as shown in FIG. 1 an FIG. 2, a waveguide 2 (second waveguide) is disposed near the waveguide 1 (first waveguide) thereby enabling to detect the intensity of light transmitting through the first waveguide 1 (the illustrated waveguide corresponds to the core portion of the waveguide). That is, evanescent light is generated on the core surface of the waveguide 1. When the waveguide 2 is disposed near the core of the waveguide 1 such that the distance between the waveguide 1 and the waveguide 2 is less than the optical wave length, the evanescent light on surface of the waveguide 1 is coupled to the waveguide 2. As a result, a portion of the light transmitting through the waveguide 1 is guided to the waveguide 2. The light guided to the waveguide 2 propagates in the downward direction (on the side of the medium), which is reflected at a turn back point 41 and propagated in the upward direction (to the upper surface of the slider) through a third waveguide 3. The light propagating upward is detected by a photodetector (photodiode) 16 disposed above the waveguide 3. It may be considered to form the photodiode 16 for detecting the light coupled to the second waveguide 2 to the air bearing surface of the slider 5 (surface on the side of medium) as shown in FIG. 8. In this case, however, unevenness is formed to the air bearing surface where air stream is disturbed. As a result, the flying amount of slider becomes instable. Accordingly, in this embodiment, the light is turned back at the turn back point 41 such that the photodiode 16 can be disposed to the upper surface of the slider 5. The output of the photodiode 16 is in proportion with the intensity of the light transmitting in the waveguide 1. Accordingly, the light intensity of the semiconductor laser 25 as the light source can be detected based on the detection output from the photodiode 16.

Figure 5A:
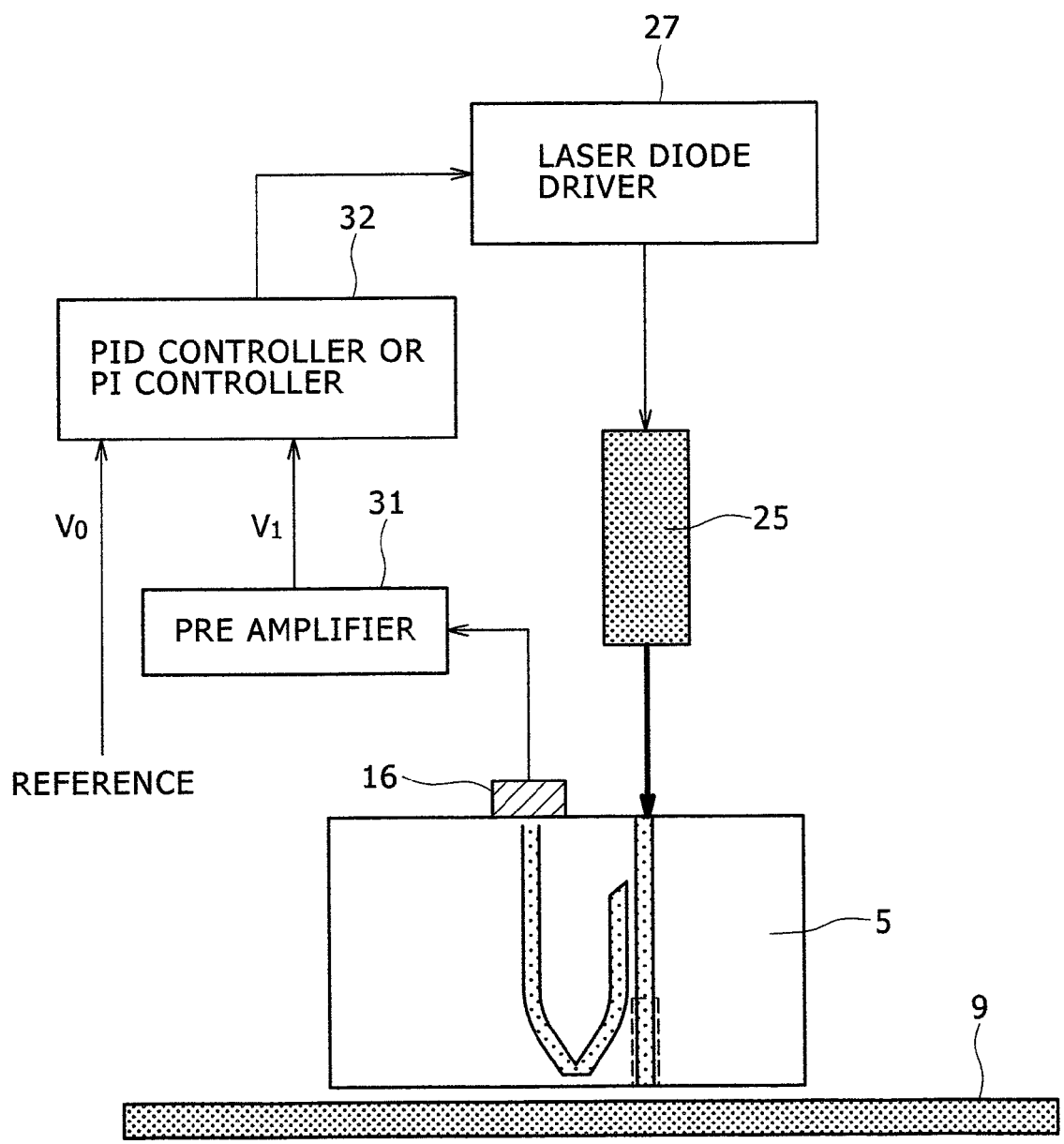
FIG. 5A is a view showing a feedback loop for controlling the light intensity constant in a magnetic recording apparatus according to the invention.

Then, with reference to FIG. 5A, feedback control of a laser power in the magnetic recording apparatus having the thermally assisted magnetic recording head therein according to the first embodiment is to be described. As shown in FIG. 5A, when the feedback loop is formed so as to make the output of the photodiode 16 constant, the intensity of the light transmitting in the waveguide 1 can be made constant. That is, the output current of the photodiode 16 is converted into a voltage signal by a preamplifier 31, and the output voltage $V_1$ therefrom is inputted to a PID or PI control circuit 32. The PID or the PI control circuit 32 compares the output voltage $V_1$ of the preamplifier 31 with a reference voltage $V_0$ and, when the output voltage $V_1$ of the preamplifier 31 is higher than the reference voltage $V_0$, it sends a signal to a laser driver 27 so as to lower the current flowing to the semiconductor laser 25. It is assumed that the output of the preamplifier changes to the positive side when the optical intensity is higher. In the opposite case, a signal is sent to the laser driver 27 such that the current flowing in the laser 25 increases. Thus, the intensity of light transmitting in the waveguide 1 can be made constant.

If the fabrication error of the waveguide is sufficiently small, the value for the reference voltage $V_0$ may be identical for each of the heads. However, if the fabrication error of the waveguide is large, the ratio of the intensity of light incident to the medium surface to the intensity of light incident to the photodiode is different per head. Accordingly, the reference voltage $V_0$ should be changed on every head. This compensation is conducted, for example, as described below.

(1) Upon assembling the head, an amount of light emitting from the waveguide 1 to the side of the air bearing surface of the slider 5 is detected. The intensity of the laser 25 is adjusted such that the amount of the light is at an optimal value (feedback is not actuated in this case). The output $V_1$ from the photodiode 16 in this case is defined as the reference voltage $V_0$.

(2) After assembling the recording apparatus, a writing and reading test is conducted while continuously changing the reference voltage $V_0$. In this case, the reference voltage $V_0$ where the S/N ratio of the read signal is highest is stored in the apparatus. While the test may be conducted only just after the assembling of the apparatus, it is preferably conducted periodically so as to maintain the reliability of the apparatus for a long time. For example, the writing and reading test is conducted for example, just before the recording operation, upon putting the power source to on, or in an idling state with no access to the data, by utilizing a not-recorded position. By conducting the test periodically as described above, errors attributable to the aging deterioration of the apparatus such as aging deterioration of the semiconductor laser can be suppressed.

Figure 5B:
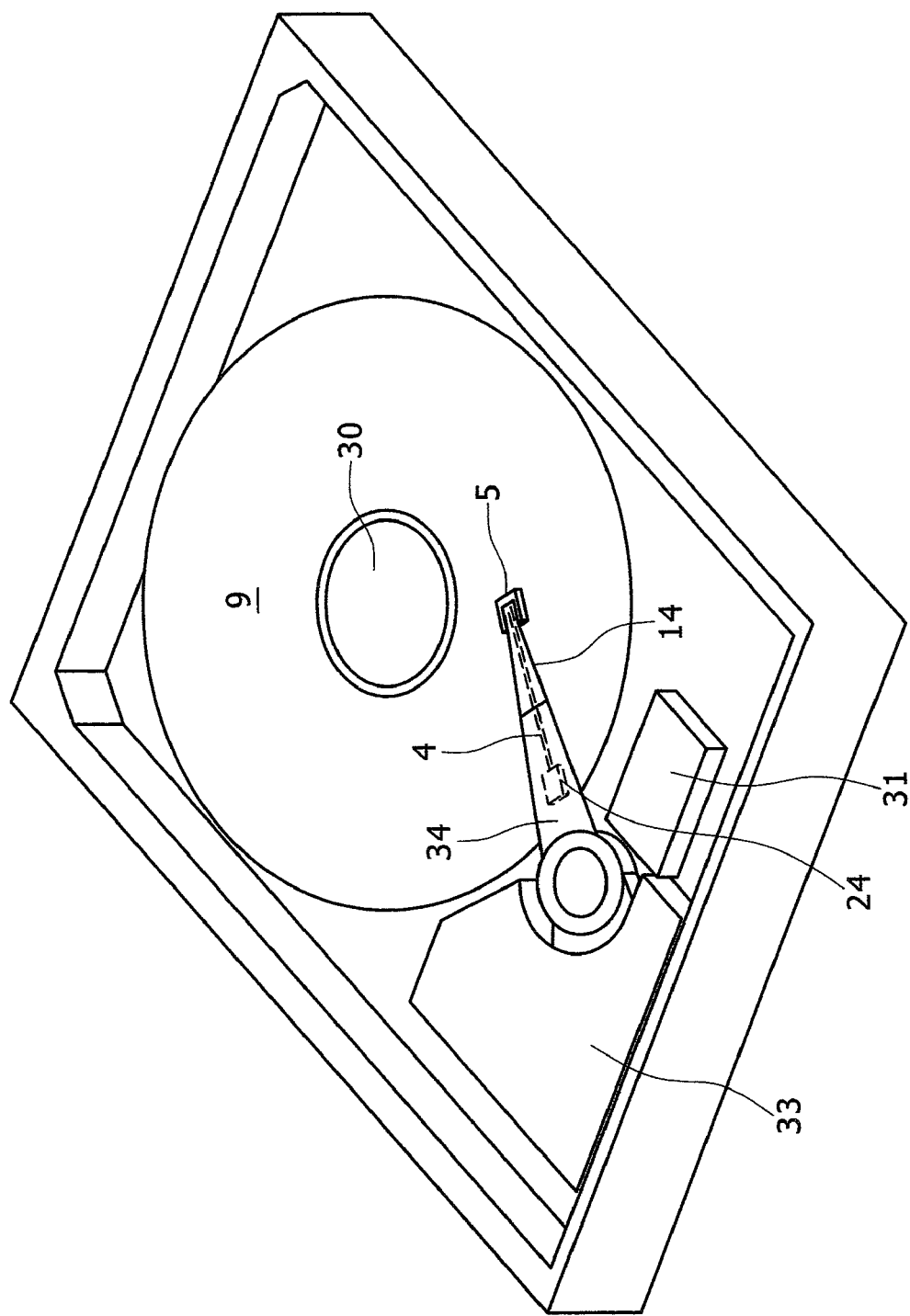
FIG. 5B is a view showing the entire constitution of a magnetic recording apparatus according to the invention.

Then, with reference to FIG. 5B, the entire constitution of a magnetic recording apparatus (magnetic disk unit) having a thermally assisted magnetic recording head mounted thereon conducting feedback control is to be described. The flying slider 5 is supported on a suspension 14, and the suspension 14 is supported on an arm 34. The flying slider 5 is moved in the radial direction of a magnetic disk 9 by a voice coil motor 33 by way of the arm 34 and the suspension 14 and positioned to a recording track. A flying rail is formed to the air bearing surface of the flying slider 5 and it flies at a flying amount of 10 nm or less above the upper surface of the rotating magnetic disk 9. The magnetic disk 9 is secured to and rotated by a spindle 30 rotationally driven by the motor. The semiconductor laser 25 is mounted in a thin package 24 mounted at the base of the arm 34. Light from the semiconductor laser 25 is coupled to the waveguide 4 and guided to the flying slider 5. At the instance of recording, a magnetic field is generated by coils 8 disposed in the flying slider 5 and, simultaneously, the semiconductor laser 25 is caused to emit light and a recording mark is formed by a main pole 6. The data recorded on the magnetic disk 9 is read by a magnetic reading device (GMR or TMR device) disposed in the flying slider 5. The recording signal and the reading signal are amplified by a preamplifier 31. A signal processing circuit for processing write signals supplied to the preamplifier 31 and processing read signals from the preamplifier 31, a control circuit for conducting the feedback control, and a control circuit for the entire apparatus are mounted to a circuit substrate attached to the back surface of a casing.

Then, a concrete constitution of an electromagnetic conversion device portion of the thermally assisted magnetic recording head according to the first embodiment is to be described with reference to FIG. 1 and FIG. 2. For the waveguides 1, 2, and 4, the material for the core is $Ta_2O_5$ and the material for the clad is $SiO_2$. The entire length $L_2$ for the waveguide 1 passing on the side of the main pole 6 is 300 μm (corresponding to the thickness of the flying slider 5). Each width $W_0$ in the direction y of the waveguide 1 and the waveguide 2 is 250 nm. Each of widths $W_1$, $W_2$, $W_3$ for the waveguide 1, the waveguide 2, and the waveguide 3 is 250 nm. The gap s between the waveguide 1 and the waveguide 2 is 450 nm. The length $L_1$ for the portion where the waveguide 1 and the waveguide 2 are in parallel is 10 μm. The length $L_3$ for the waveguide 2 is 200 μm and the distance $L_4$ from the waveguide 1 to the turn back point 41 is 5 μm. The distance $L_5$ from the waveguide 1 to the photodiode 16 is 15 μm. The turn back point 41 of the waveguide 2 is reflection surface and adapted such that the optical channel is bent by 90° by total reflection. An anti-reflection film 17 formed of a dielectric multi-layer film is formed at the end of the waveguide 3 on the side of the photodetector 16. If the light is reflected at the end, the light returns to the semiconductor laser 25 to make the oscillation of the semiconductor laser 25 instable (generating return light noise). In a case of forming the anti-reflection film 17 as described above, such generation of the reflection light can be prevented. For the photodetector 16, an Si photodetector is utilized. The Si photodetector is directly fabricated on a mount 12 made of Si disposed above the slider (pn junction is directly fabricated on the Si). It may suffice that the diameter of the photo-receiving surface is larger than the value for the sum of the beam diameter in the waveguide 3 and an alignment error upon arranging a detector and it is set to 5 μm in this embodiment. Interconnection for the photodetector is fabricated on the mount 12. The mount 12 is fixed to a lower portion of a flexure 13 of the suspension 14.

Figure 6:
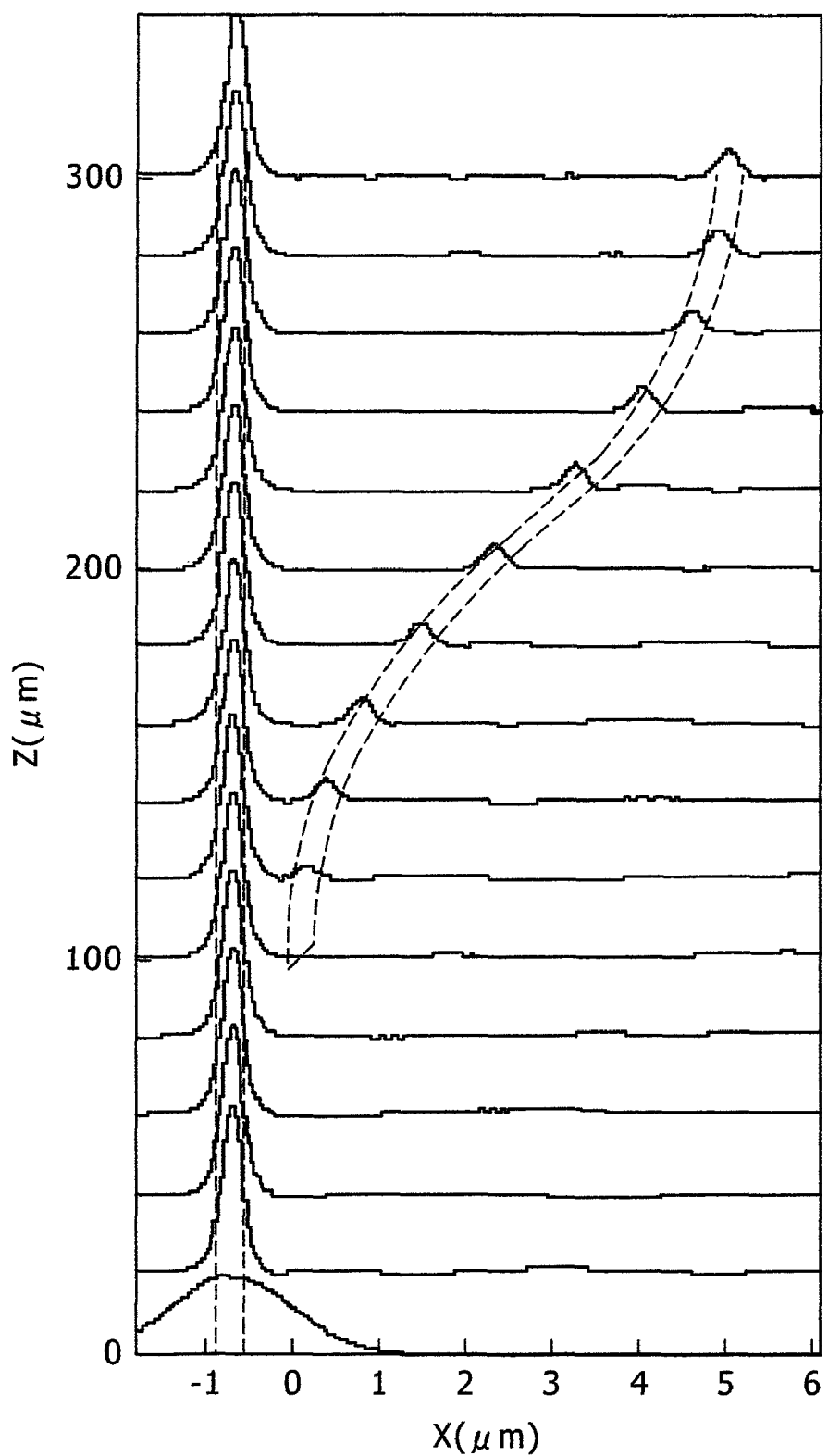
FIG. 6 is a view showing the result of calculation for the intensity distribution of light propagated through the waveguide structure in the first embodiment.

FIG. 6 shows the result of calculation for optical distribution in the coupling portion between the waveguide 1 and the waveguide 2 in the first embodiment. The lower side corresponds to the incident side and the upper side corresponds to the side of the medium. The spot diameter for the incident light is 2 μm in the direction x and 1 μm in the direction y. As shown in the drawing, the fundamental mode of the waveguide 1 is excited and a portion of the fundamental mode is branched toward the waveguide 2.

The coupling efficiency (η) from the waveguide 1 to the waveguide 2 can be adjusted by changing the distance s between the waveguide 1 and the waveguide 2, the length $L_1$ for the portion where the two waveguides are in parallel, and the refractive index and the diameter of respective waveguides. In this case, if the coupling efficiency (η) from the waveguide 1 to the waveguide 2 is excessively large, since the intensity of the light irradiated to the surface of the medium is lowered, the temperature on the surface of the medium is lowered. Assuming the power of the semiconductor laser 25 as $I_0$, the coupling efficiency of the light at the inlet of the waveguide 4 above the suspension as $a_1$, the coupling efficiency of the light at the inlet of the waveguide 1 in the slider as $a_2$, and the propagation efficiency at the periphery of the main pole as $a_3$ (if the waveguide 1 and the main pole 6 are brought closer, the intensity of light transmitting through the waveguide 1 is lowered under the effect of the main pole 6), the light intensity $I_{OUT}$ at the exit of the waveguide 1 is represented by the following formula (1):

$$I_{out} = I_0 \times a_1 \times a_2 \times a_3 \times (1-\eta)$$ [Equation 1]

The coupling efficiencies $a_1$, $a_2$ to the waveguides 4, 1 are about 0.5 at the maximum considering the error upon alignment, and the propagation efficiency $a_3$ at the periphery of the main pole is about 0.5. Since the available power of the semiconductor laser is about 120 mW, $I_{OUT}$ is represented by the following equation (2):

$$I_{out} = 15 \times (1-\eta) \text{ [mW]}$$ [Equation 2]

Figure 7:
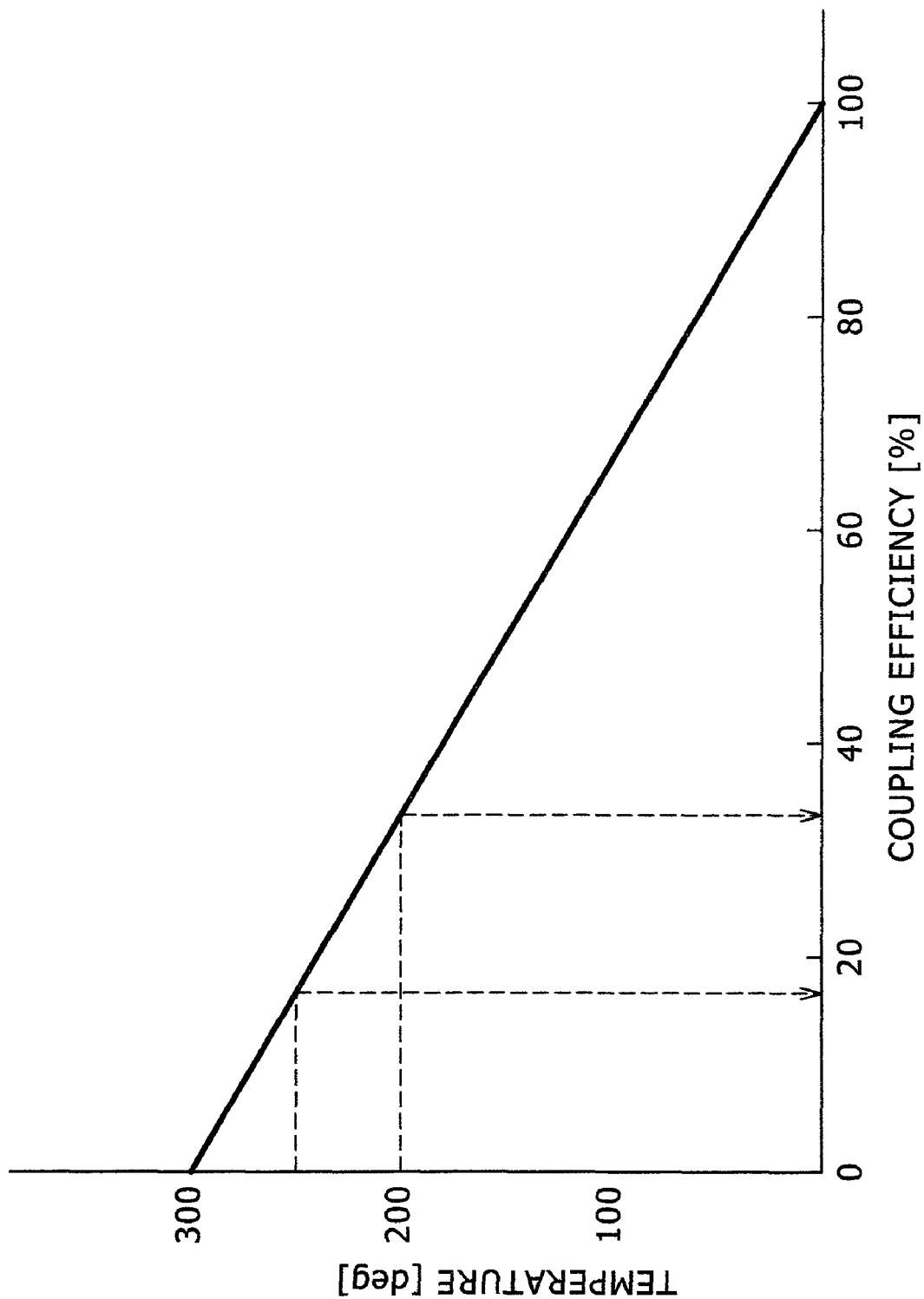
FIG. 7 is a view showing a relation between the coupling efficiency from the first waveguide to the second waveguide and the temperature on the surface of a medium.

The temperature on the surface of the medium is in proportion with $I_{OUT}$ and, in a case of utilizing the scatterer having a trigonal shape shown in FIG. 4 as the optical near-field generator 15, the temperature on the surface of the medium rises to about 200° C. at $I_{OUT}$ of about 10 mW. From the foregoing, a relation between the coupling efficiency from the waveguide 1 to the waveguide 2 and the temperature on the surface of the medium is illustrated as shown in FIG. 7. For attaining the recording apparatus having a recording density of 600 Gb/in² or higher, it is necessary to heat the medium to 200° C. or higher. It can be seen that the coupling efficiency (η) from the waveguide 1 to the waveguide 2 therefore has to be 33% or less. Further, for attaining a recording apparatus having a recording density of 1 Tb/in² or higher, it is necessary to use a medium having further larger coercivity at a room temperature and, it is necessary to heat the medium to 250° C. or higher for sufficiently lowering the coercivity. For this reason, it is necessary to restrict the coupling efficiency (η) from the waveguide 1 to the waveguide 2 to 17% or less. In this embodiment, the coupling efficiency is set to 5%.

In the embodiment described above, while $Ta_2O_5$ (refractive index 2.18) is used as the material for the core and the $SiO_2$ (refractive index=1.45) is used as the material for the clad of the waveguide, the material for the core and the clad may be other materials so long as the refractive of the core is larger than the refractive index of the clad, and, for example, the core may be $Al_2O_3$ (refractive index=1.63), $TiO_2$ (refractive index=2.44), etc. relative to the clad of $SiO_2$ (refractive index=1.45). Further, the material for the clad may be $MgF_2$ (refractive index n=1.38) with the refractive index smaller than that of $SiO_2$. Further, as the material for the core, $SiO_2$ doped with other material such as Ge may also be used.

By the way, the light proceeding in the downward direction (direction to the medium) through the waveguide 1 is incident to the optical near-field generator 15 formed in the lower portion of the waveguide 1. In this case, the near-field light generated from the optical near-field generator 15 interacts with the medium 9. As a result, scattering light is generated from the periphery of the optical near-field generator. The intensity of the scattering light changes depending, for example, on the distance between the head and the medium (flying amount of slider), the recording state of the medium, etc. The scattering light proceeds in the opposite direction through the waveguide 1 (toward the light source) and is coupled with the waveguide 2 for detection. If the light is reflected at the end 36 on the inlet of the waveguide 2, it transmits downward through the waveguide 2 and is incident to the photodiode 16. As a result, noises attributable to the scattering light are applied to the detection signal. In order to prevent this, in this embodiment, the end 36 on the inlet of the waveguide 2 is cut obliquely. In this oblique form, since the light is reflected in the oblique direction, the light no more proceeds in the downward direction of the waveguide 2, that is, in the direction to the photodetector 16. In this embodiment, the angle θ at the end 36 on the inlet of the waveguide 2 is formed at 20°. The end of the waveguide 3 on the side of the photodetector 16 may also be cut obliquely as described above for preventing the reflection light instead of forming the anti-reflection film 17.

Figure 9:
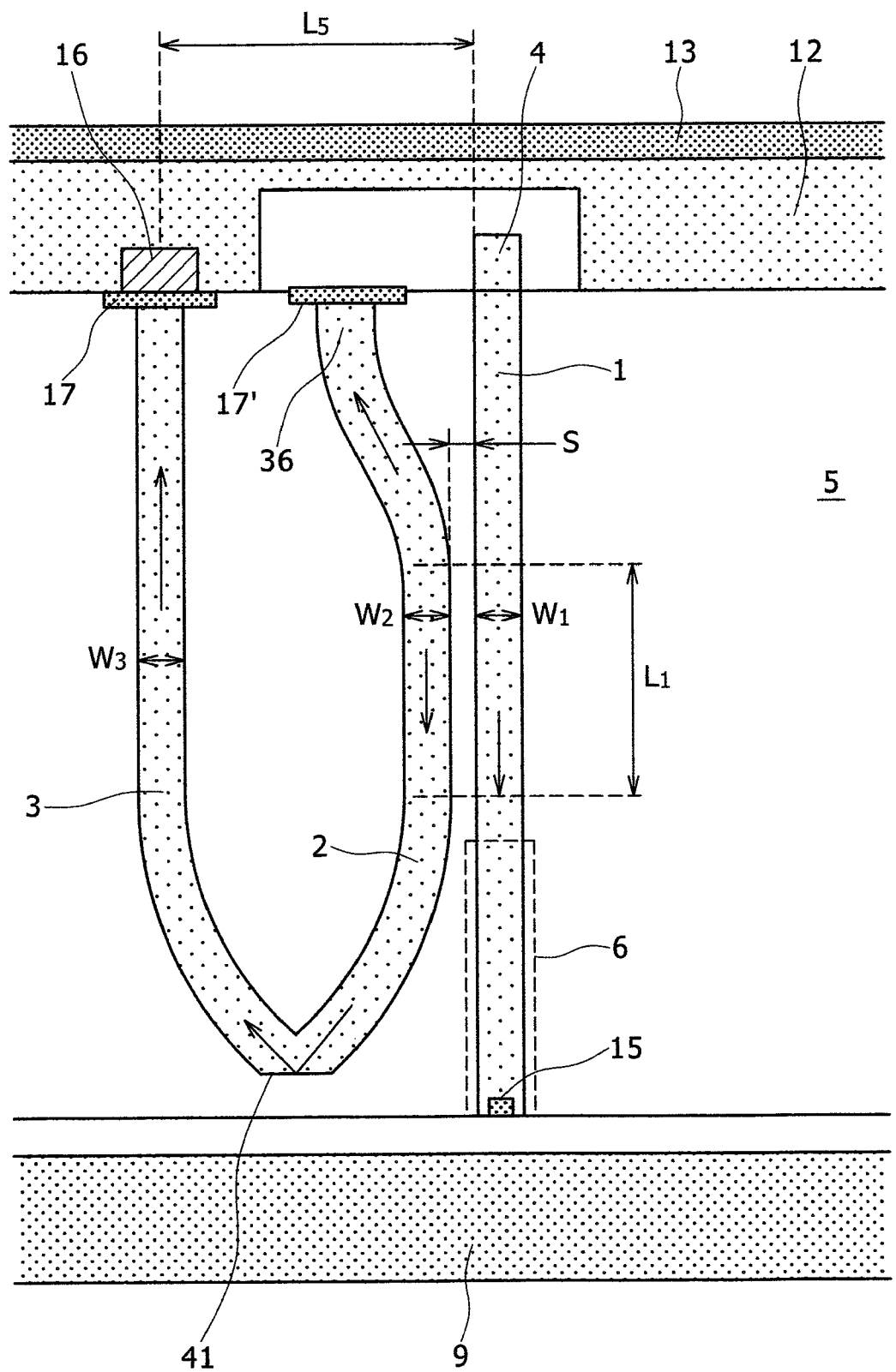
FIG. 9 is a view showing a case where the end on the inlet of the second waveguide extends as far as the upper surface of the a slider.

The end 36 on the inlet of the waveguide 2 may be extended for the length as shown in FIG. 9 as far as the upper surface of the slider. In this case, an anti-reflection film 17' formed of a dielectric multi-layer film may be preferably disposed at the end 36 at the inlet of the waveguide 2 for preventing the reflection of the light at the end 36 on the inlet of the waveguide 2.

Figure 10:
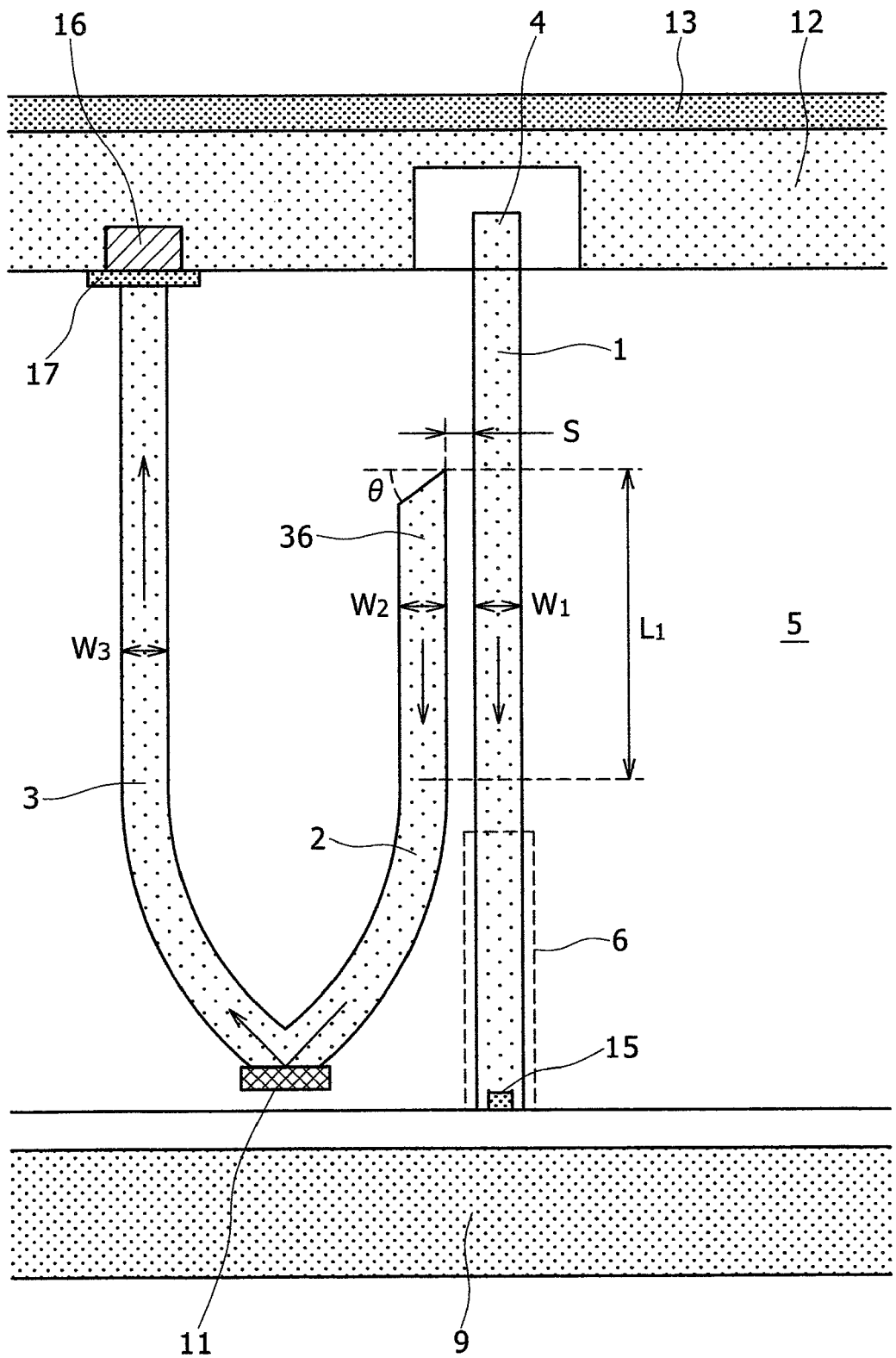
FIG. 10 is a view showing an example of disposing a metal film or a metal block at a turn back point of the second waveguide.
Figure 11:
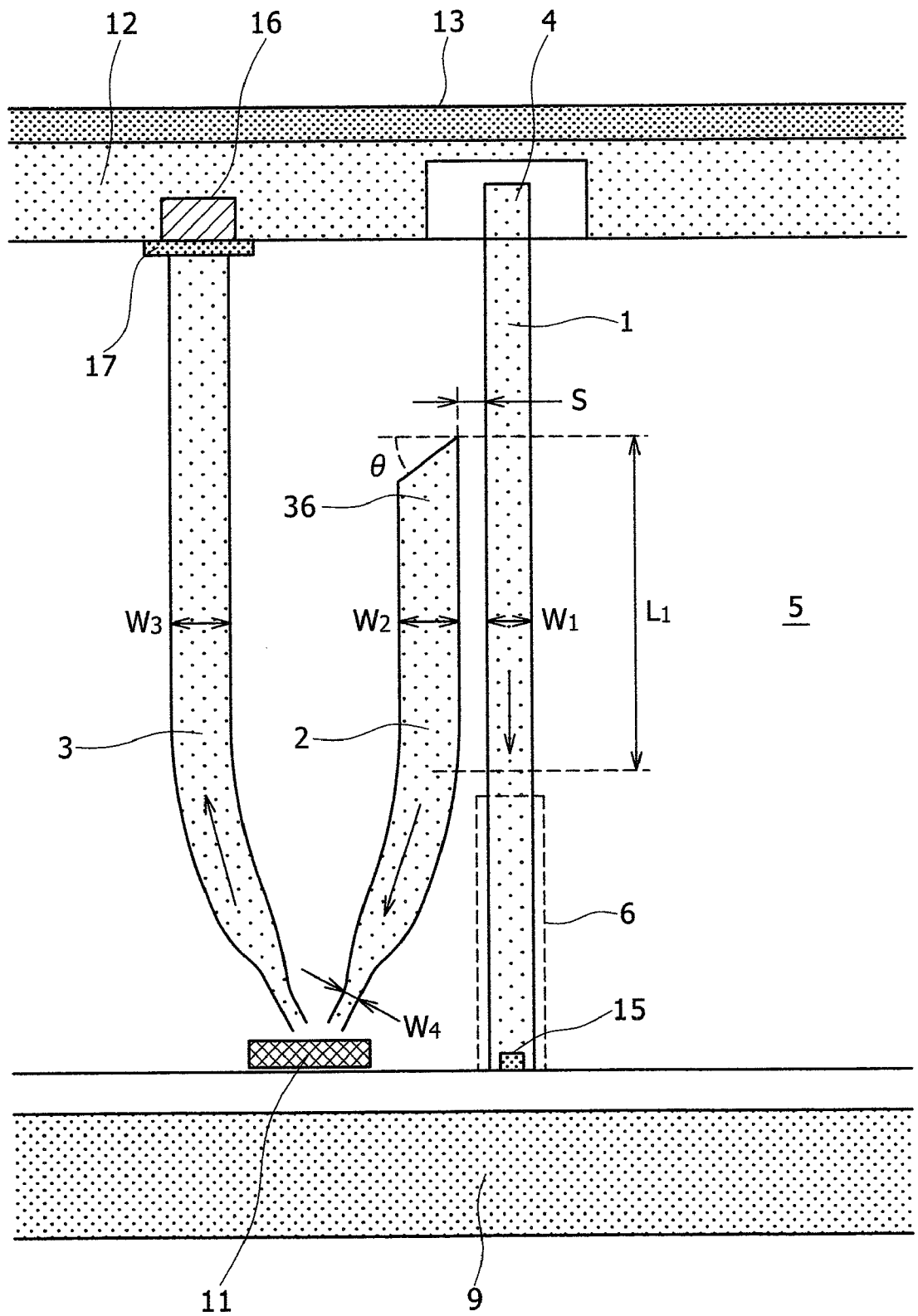
FIG. 11 is a view showing an example where the width of the waveguide is narrowed at the turn back point of the second waveguide.
Figure 12:
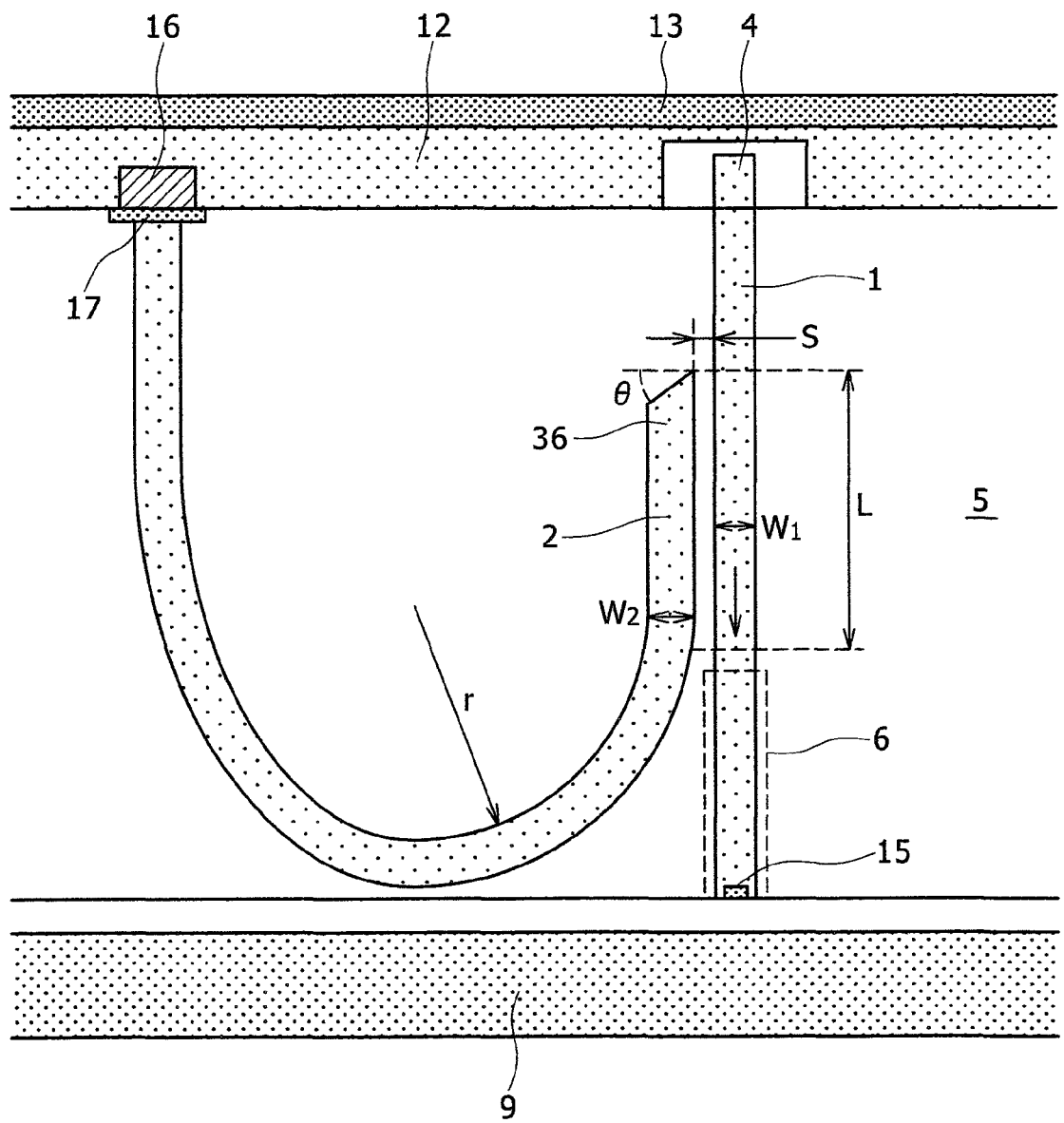
FIG. 12 is a view showing an example of forming the shape of the second waveguide into an arcuate shape.

In the embodiment described above, a total reflection mirror is used for turning back the light transmitting through the waveguide 2 to the upward direction. In this case, for decreasing the leakage of light due to the roughness at the reflection surface, a metal reflection structure 11 may be formed on the reflection surface as shown in FIG. 10. For example, a gold membrane or block is disposed as the reflection structure 11 at the turn back point 41. Further, for decreasing the energy loss at the turn back point, the width $W_4$ at the top ends of the waveguide 2 and the waveguide 3 may be made narrower than the width for other portions as shown in FIG. 11. In this constitution, the field diameter of light transmitting through the waveguides 2 and 3 is enlarged at the periphery of the turn back point 41. Accordingly, the effect of the positional displacement is decreased thereby enabling to decrease the loss due to positional displacement.

In the foregoing descriptions, the light is reflected at the turn back point 41 for guiding the light propagating in the waveguide 2 to the photodiode 16 disposed on the upper surface of the slider, the advancing direction of the light may be rotated by 180° by forming the shape of the waveguide 2 in an arcuate shape instead of reflecting the light. In this case, for decreasing the emission light generated from the bent portion, the difference of the refractive index between the core and the clad of the waveguide 2 is preferably made larger. For example, it is set such that the wavelength to be used is 830 nm, the material for the cores of the waveguides 1 and 2 is formed of Si (refractive index 3.7), the material for the clad is formed of SiO$_2$ (refractive index 1.45), the diameter for the waveguide: $w_0=w_1=w_2=200$ nm, and the radius of curvature r is 200 µm.

Figure 13:
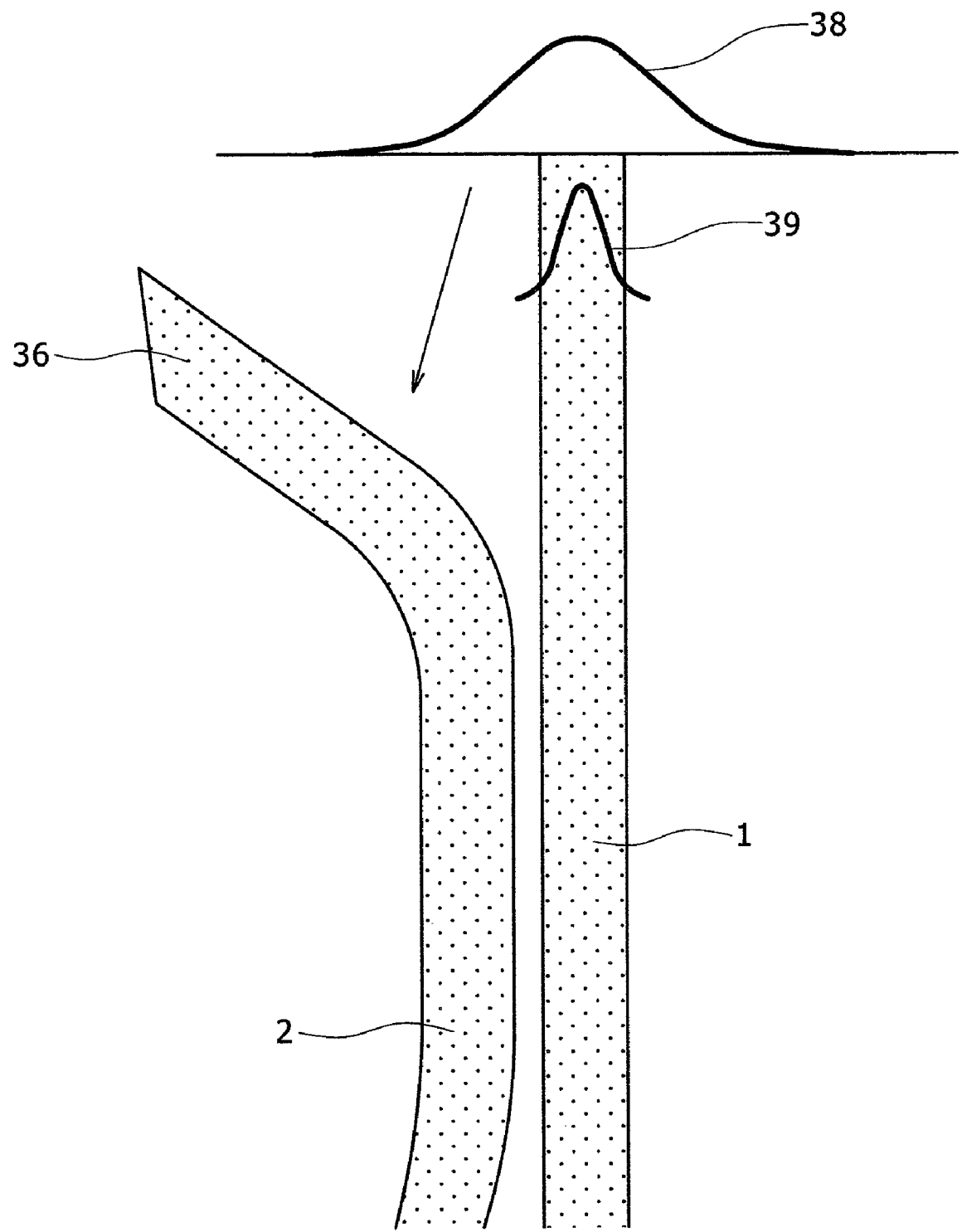
FIG. 13 is a view showing an example of laterally bending the end on the inlet of the second waveguide.
Figure 14:
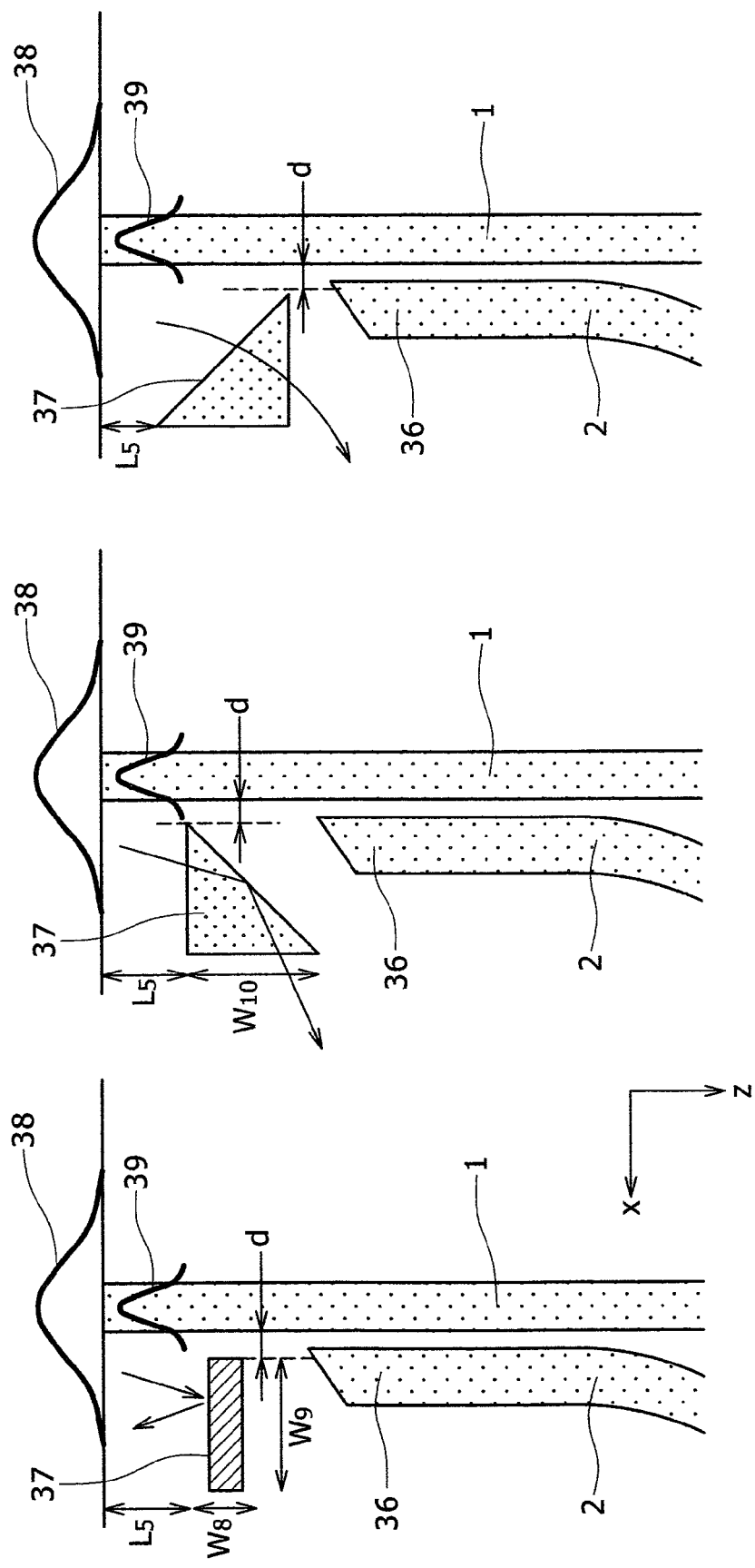

By the way, in the thermally assisted magnetic recording, the diameter for the intensity distribution of light transmitting through the waveguide 1 is preferably as small as possible. That is, for increasing the generation efficiency of the near-field light, the intensity distribution of light transmitting through the waveguide 1 is preferably as small as possible. In this case, as shown in FIG. 13, since the diameter of the intensity distribution 39 of the light transmitting through the waveguide 1 is smaller than the diameter of the intensity distribution 38 of the incident light, a portion of the incident light leaks sideways as radiation light not coupling to the waveguide 1. When the leakage light intrudes into the waveguide 2 from the end 36 on the inlet of the waveguide 2, the intensity of the light transmitting through the waveguide 1 can not be monitored accurately. For preventing this, the end 36 on the inlet of the waveguide 2 is preferably directed laterally (direction perpendicular to the direction of the waveguide 1) as shown in FIG. 13. Further, instead of laterally directing the end 36 on the inlet of the waveguide 2, a shield structure 37 may be formed above the end 36 on the inlet of the waveguide 2 as shown in FIGS. 14A to 14C. In the example of FIG. 14A, a metal block is formed as the shield structure 37. In a case of forming such a block, the leaked light not being coupled to the waveguide 1 is reflected at the block 37 and proceeds upward, it does not enter the waveguide 2. In this example, the block has a width $W_9$ of 5 µm in the direction x and a width $W_8$ of 1 µm in the direction z, and a thickness of 250 nm in the direction y, which is identical with that of the waveguide 2. Since the evanescent light exudes to the core surface of the waveguide 1, if the gap d between the shield structure 37 and the waveguide 1 is excessively small, this hinders progress of the evanescent light. Accordingly, the gap d between the shield structure 37 and the waveguide 1 is preferably made larger than the exuding depth of the evanescent light (which is about equal with the optical wavelength). In this example, the gap d is set to 780 nm. The distance $L_5$ from the upper surface of the slider to the shield structure 37 is 30 µm. For the shield structure 37, a prism formed of light transmitting dielectrics may be utilized as shown in FIGS. 14A and 14C. In a case of FIG. 14B, the leaked light not coupled to the waveguide 1 is incident to the prism 37, then totally reflected on the surface, and proceeds in the lateral direction. Accordingly, it does not proceed to the waveguide 2. Further, in a case of FIG. 14C, the light is incident to the prism 37, then refracted at the surface of the prism and proceeds in the lateral direction. Accordingly, it does not proceed to the waveguide 2. The material for the prism is Ta$_2$O$_5$ like the waveguides 1 and 2. As described above, in a case of forming the prism of the material identical with that of the waveguide, it can be fabricated at the same time with the waveguide to decrease the fabrication labor. In the prism, the length $W_{10}$ for one side is 5 µm, the distanced between the waveguide 1 and the prism is 780 nm and the distance $L_5$ of the upper surface of the slider is 30 µm. Further, the shield structure 37 not only can prevent the leaked light from proceeding to the waveguide 2 but also can prevent heating for the periphery of the magnetic head by the leaked light to deteriorate the performance of the magnetic head. For this reason, the shield structure 37 is preferably disposed not only above the waveguide 2 but also on both sides of the waveguide 1.

Figure 15:
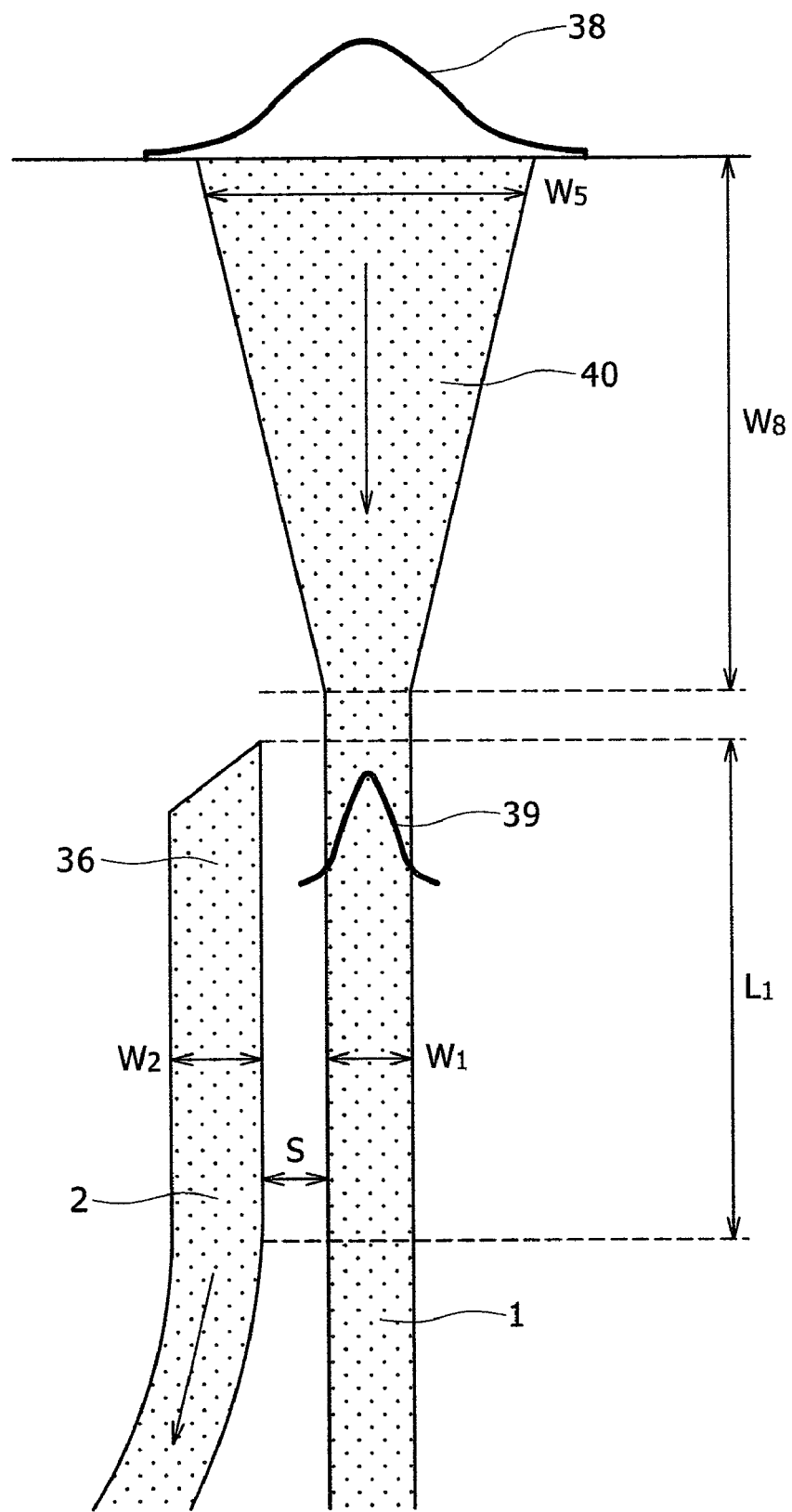
FIG. 15 is a view showing an example of disposing a tapered portion on the inlet of the first waveguide showing a case where the lateral side of the tapered portion is linear.

If the diameter of the intensity distribution of light transmitting through the waveguide 1 is smaller than the diameter for the intensity distribution of incident light, since the incident light partially leaks laterally, this lowers the coupling efficiency of the incident light to the waveguide 1. In order to prevent this, it is preferred to enlarge the width $W_5$ at the inlet of the waveguide 1 and dispose a tapered portion 40 on the inlet of the waveguide 1 as shown in FIG. 15. In this case, while higher order modes are excited, as well as the fundamental mode in the waveguide 1, a portion of the higher order modes is converted in to the fundamental mode. As a result, higher coupling efficiency can be obtained. However, the higher order mode and the fundamental mode cause interference in the waveguide. Since the intensity distribution is changed by external disturbance such as temperature, the intensity of light transmitting through the narrowed portion of the waveguide 1 fluctuates. On the contrary, in a case of disposing the waveguide 2 for detecting the light intensity to a portion below the final end of the tapered portion 40 (boundary between the portion where the width $W_1$ of the waveguide is made constant and the tapered portion 40) (a portion near the air bearing surface of the slider), the light intensity at a portion where the width $W_1$ of the waveguide is constant can always be kept constant by using the feedback loop. That is, the coupling efficiency can be improved while suppressing the fluctuation of the light intensity. In this example, the material for the core is Ta$_2$O$_5$ and the material for the clad is SiO$_2$ in the waveguides 1, 2, and 3. The size is set to 250 nm for each of the thickness $W_0$ of the waveguides 1, 2, and 3, the width $W_1$ of the waveguide 1, the width $W_2$ of the waveguide 2, and the width $W_3$ of the waveguide 3. The lateral side of the tapered portion 40 is made linear, the width $W_5$ on the inlet of the tapered portion 40 is 2 µm, and the length $W_8$ of the tapered portion 40 is 100 µm. The gap s between the waveguides 1 and 2 is 450 nm, and the length $L_1$ for the portion where the waveguides 1 and 2 are in parallel is 10 µm.

Figure 16:
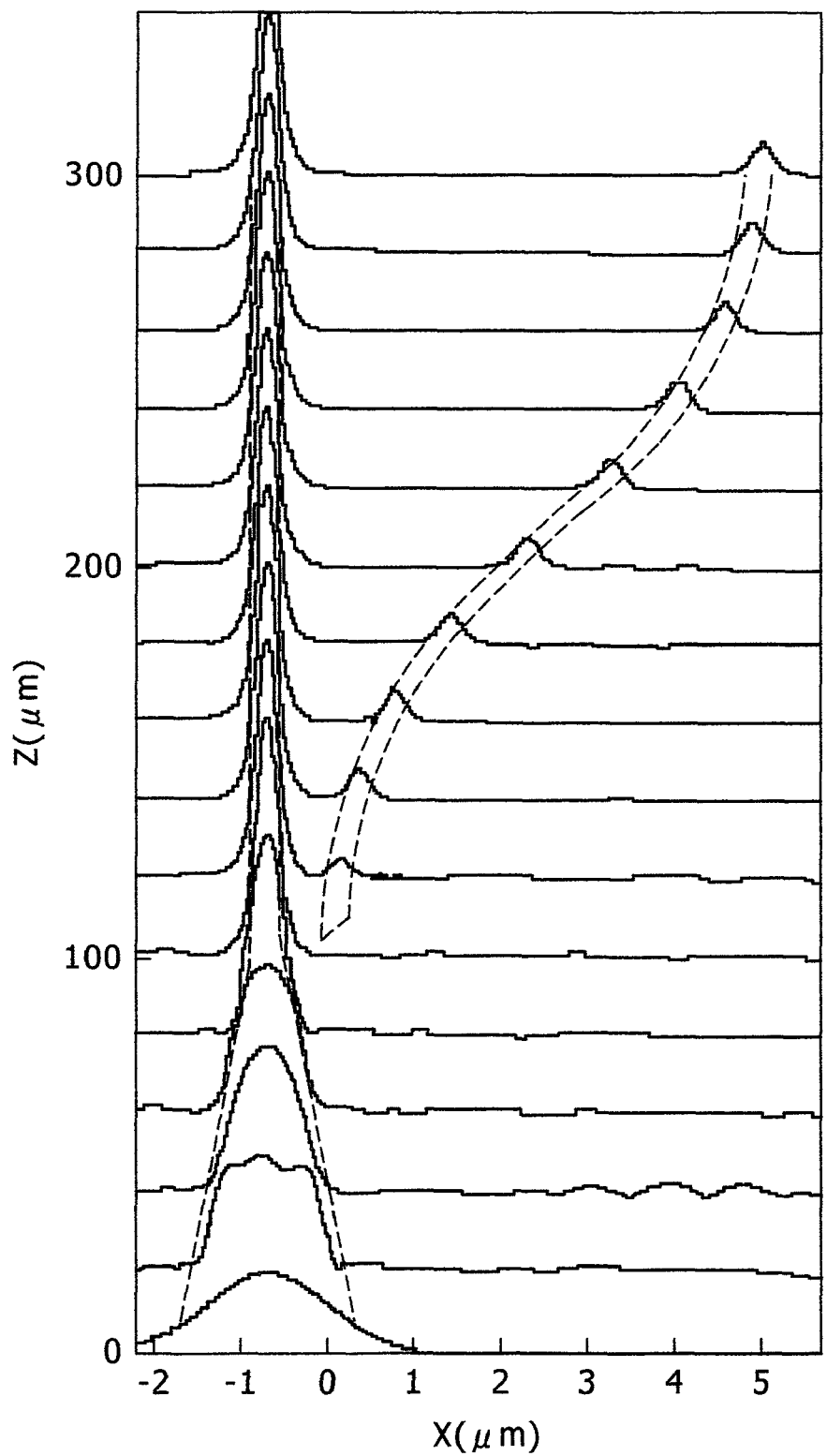
FIG. 16 is a view showing the result of calculation for the distribution of light intensity in the waveguide in a case of disposing the tapered portion on the inlet of the first waveguide.
Figure 17:
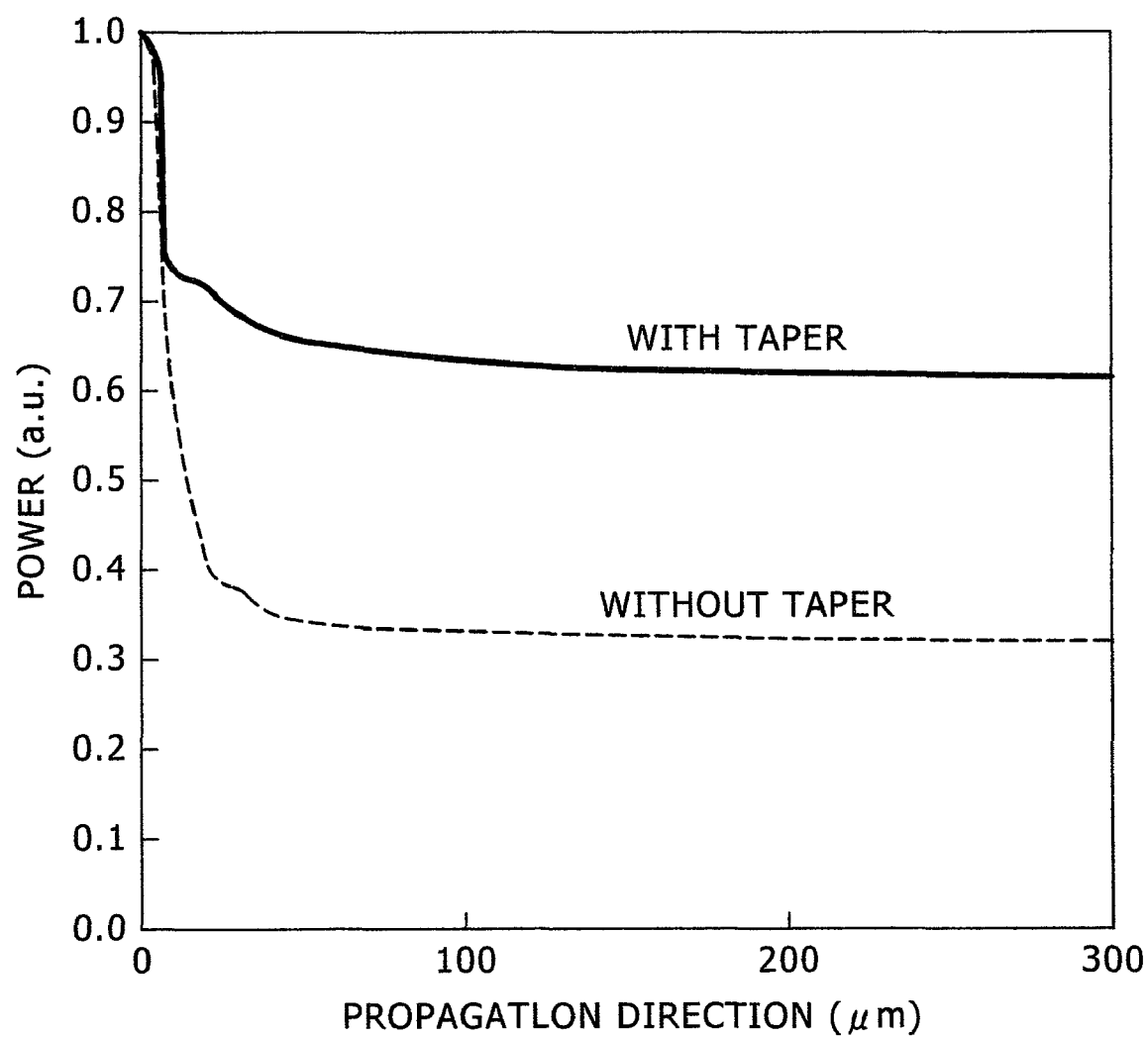
FIG. 17 is a view showing the result of calculation for the optical power distribution in the waveguide in a case disposing or not disposing the tapered portion on the inlet of the first waveguide.

FIG. 16 shows the intensity distribution of light in the waveguides 1 and 2. In this case, the spot diameter of the incident light is 2 µm in the direction x and 1 µm in the direction y. As shown in the drawing, the intensity distribution of light in the tapered portion is gradually narrowed for the width and the width of the intensity distribution is constant in a portion where the width of the waveguide is constant. Then, a portion is coupled to the waveguide 2. In this example, the coupling efficiency (η) from the waveguide 1 to the waveguide 2 is about 5%. FIG. 17 shows a distribution of an optical power in the waveguide for the case where the tapered portion 40 is present or not present. In this case, the optical power is normalized by the value of the incident light. It can be seen that the amount of the light transmitting as far as the exit of the waveguide 1 is increased by about twice by providing the tapered portion as described above.

Figure 18A:
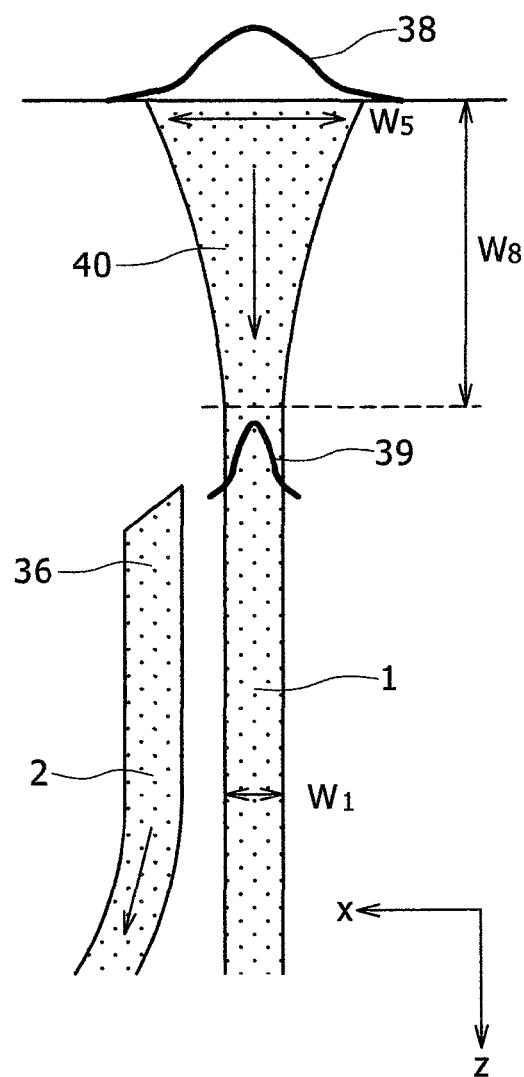
Figure 18B:
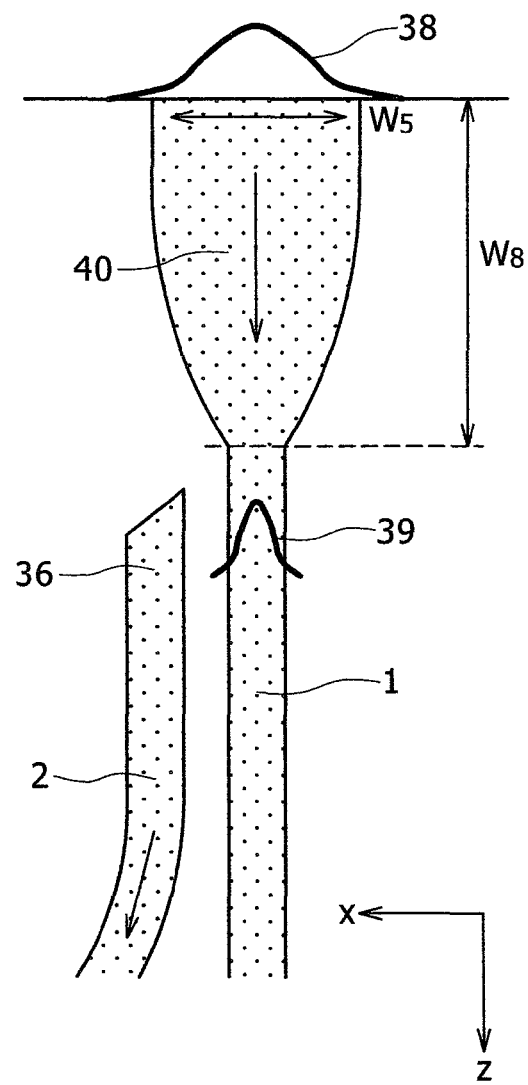

In the example described above, the lateral side of the tapered portion 40 is made linear. However, it may be curved as shown in FIGS. 18A and 18B. In the example of FIG. 18A, the width in the direction x is narrowed exponentially. In the example of FIG. 18B, the width W(z) in the direction x is changed as shown by the equation 3.

$$W(z)=W_1+(1-(z/W_8)^2)\cdot(W_5-W_1) \qquad \text{[Equation 3]}$$

Figure 19:
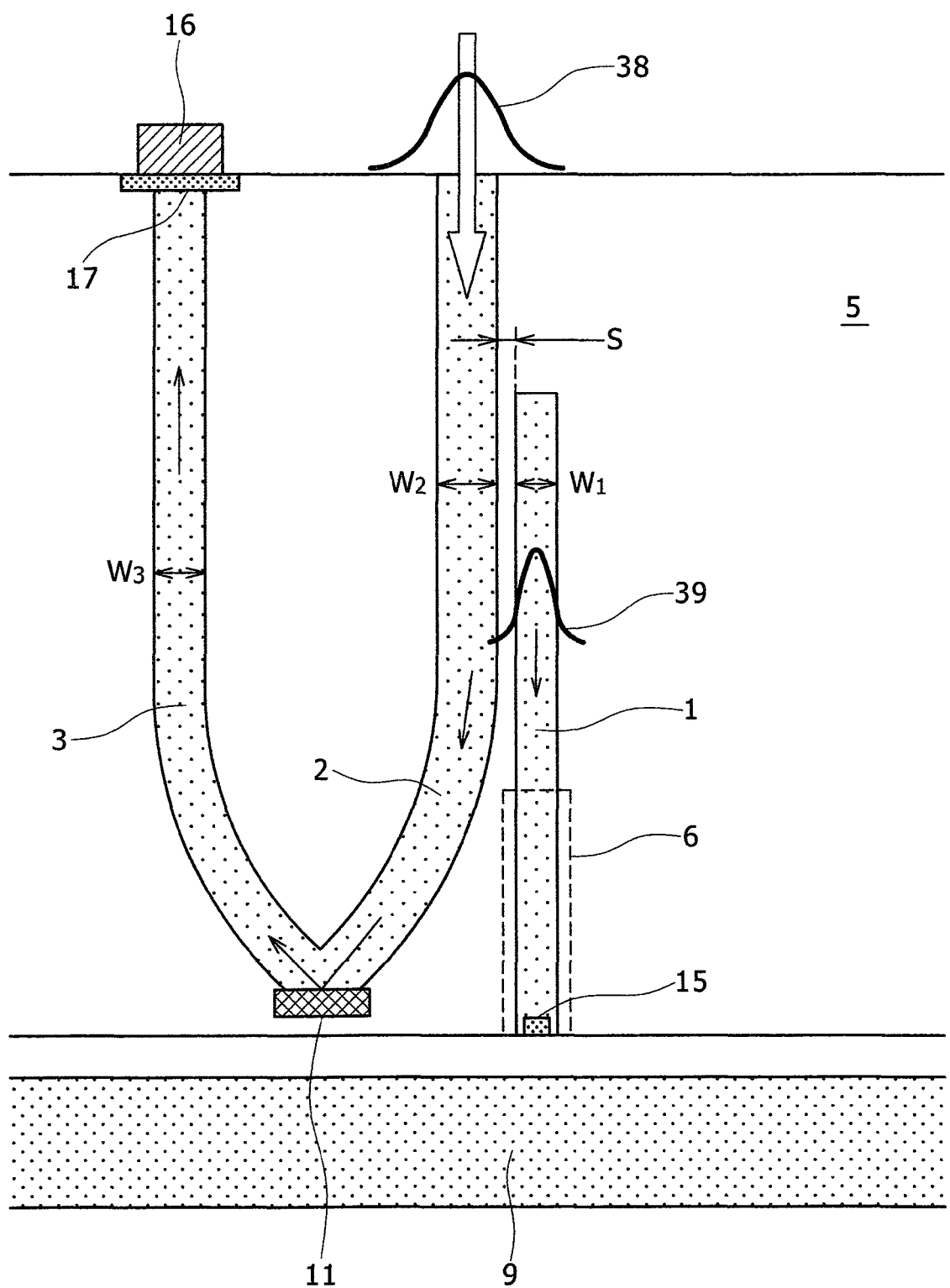
FIG. 19 is a view showing a waveguide structure of a thermally assisted magnetic recording head according to a second embodiment.

Then, with reference to FIG. 19, a constitution of a thermally assisted magnetic recording head according to a second embodiment is to be described. The entire constitution is identical with that described for FIGS. 3A and 3B. In the first embodiment, the incident light is coupled to the waveguide 1 for guiding the incident light to the vicinity of the main pole. However, in the second embodiment, as shown in FIG. 19, the incident light is coupled to a waveguide 2 connected to a photodiode 16. In this case, the light transfers from the waveguide 2 to the waveguide 1. The coupling efficiency ($\eta$) from the waveguide 2 to the waveguide 1 necessary for sufficiently increasing the heating temperature of the medium can be determined by conversely considering the coupling efficiency to the first embodiment where the light transfers from the waveguide 1 to the waveguide 2, and it is necessary to determine the efficiency: $\eta=0.67$ or more (when the rising temperature is 200° C.) or $\eta=0.83$ or more (when the rising temperature is 250° C.).

As described above, in a case of coupling the incident light to the waveguide 2 connected with the photodiode 16, the coupling efficiency of the incident light to the waveguide 2 is higher as the diameter of the mode field of the waveguide 2 is nearer to the diameter of the incident light. On the other hand, the diameter of the mode field of the waveguide 1 is preferably as small as possible (the near-field light generating efficiency is higher as the diameter of the mode field of the waveguide 1 is smaller). The foregoing requirements may be satisfied by setting the width $W_2$ of the waveguide 2 larger than the width $W_1$ of the waveguide 1. When the width $W_2$ of the waveguide 2 is enlarged such that the diameter of the mode field of the waveguide 2 is close to the diameter of the incident light, the coupling efficiency of the incident light to the waveguide 2 is improved. Then, when the light is transferred from the waveguide 2 to the waveguide 1 of a smaller width by way of the evanescent light, the light can be guided efficiently to the waveguide 1 of a smaller width. That is, the entire efficiency (ratio between the light energy at the inlet of the waveguide and the near-field light energy) can be increased.

As described above, in a case of making the width $W_2$ of the waveguide 2 larger than the width $W_1$ of the waveguide 1, higher order modes are sometimes excited when the width $W_2$ is excessively large. In this case, the amount of the light in the waveguide may possibly fluctuate. In order to prevent this, the refractive index of the core for the waveguide 2 may be made smaller than the refractive index of the core for the waveguide 1. As the refractive index of the core is smaller, the width of the waveguide in which the higher order modes can be present is enlarged. That is, the high modes are less likely to be excited. The excitation mode of the waveguide depends on the difference of the refractive index between the core and the clad. Accordingly, the refractive index of the clad for the waveguide 2 may also be made larger instead of decreasing the refractive index of the core for the waveguide 2.

In a case of making the width $W_2$ of the waveguide 2 larger than the $W_1$ of the waveguide 1 as described above, for enhancing the coupling efficiency of light from the waveguide 2 to the waveguide 1, the width $W_6$ of the waveguide 2 in the coupling portion may be partially narrowed as shown in FIG. 20A, width $W_7$ of the waveguide 1 in the coupling portion may be partially narrowed as shown in FIG. 20B or both the widths $W_6$, $W_7$ of the waveguides 1 and 2 in the coupling portion may be narrowed partially. As shown in FIG. 21, when the diameter of the waveguide is smaller than a certain value $W_b$, the diameter of the mode field increases. This is because the component of the evanescent light exuding the core surface increases more as the diameter is smaller. Accordingly, in a case of decreasing the width of the core to a value $W_a$ smaller than the $W_b$ where the diameter of mode field is minimized, the exuding length on the side of another waveguide placed in adjacent therewith is increased to improve the coupling efficiency to the adjacent waveguide. For example, in a case of partially narrowing the width $W_6$ of the waveguide 2 at the coupling portion as shown in FIG. 20A, the diameter of the mode field in the waveguide 2 is enlarged at a partially narrowed portion of the waveguide 2. This increases the exuding depth of the evanescent light that exudes to the core surface, thereby, facilitating coupling to the waveguide 1. Further, as shown in FIG. 20B also, in a case of partially narrowing the width $W_7$ of the waveguide 1 at the coupling portion, the diameter of mode field in the waveguide 1 enlarges at the partially narrowed portion of the waveguide 1. As a result, coupling with the waveguide 2 is facilitated.

Figure 22:
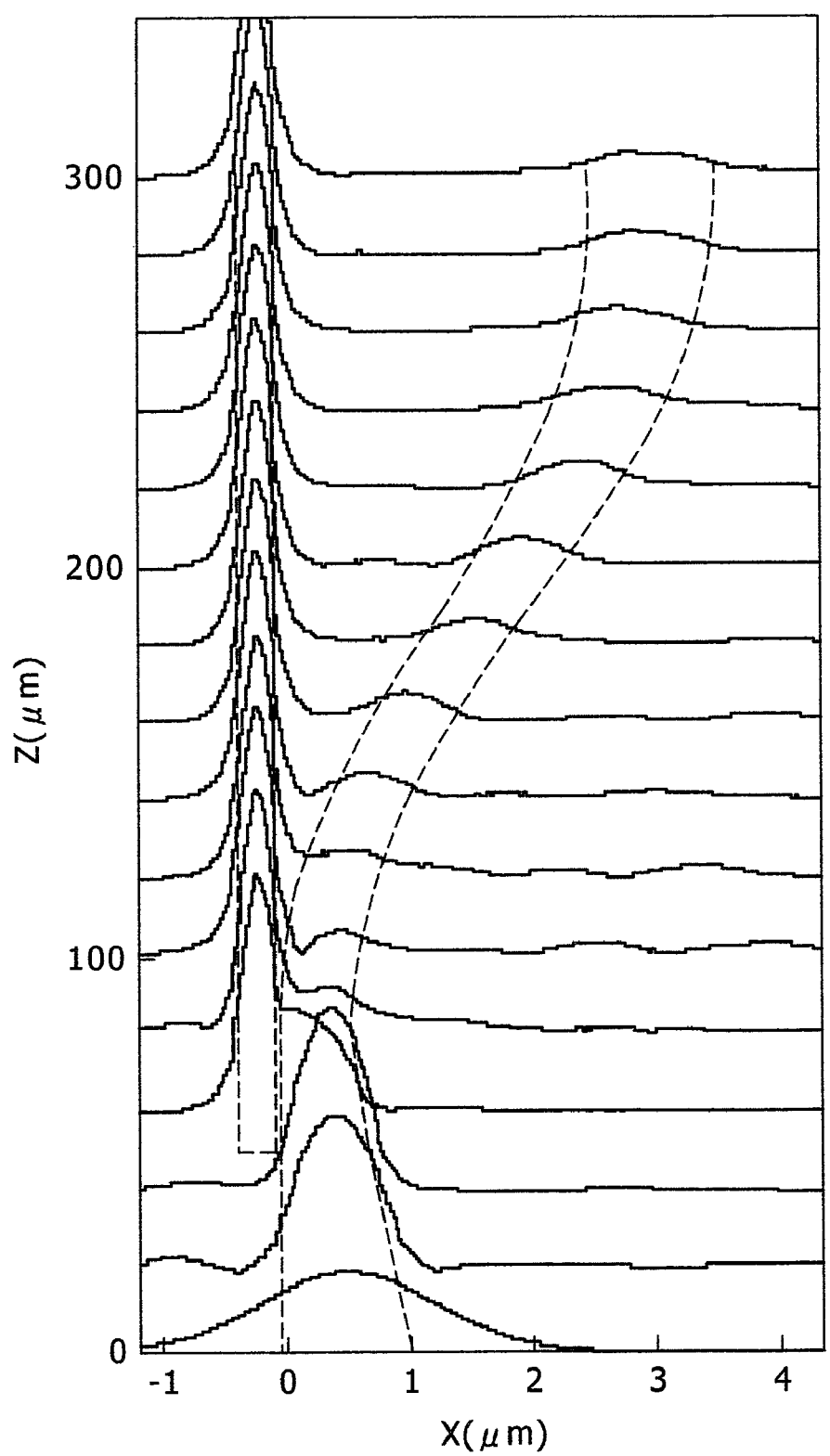
FIG. 22 is a view showing the result of calculation for the distribution of light intensity in the waveguide according to the second embodiment.

FIG. 22 shows the result of calculation for the light intensity distribution of the waveguide in a case of the constitution of FIG. 20A. In this constitution, the material for the core is $Ta_2O_5$ for the waveguide 1 and the material for the core is $Al_2O_3$ for the waveguides 2 and 3. The material of the clad is $SiO_2$ each for the waveguides 1, 2, and 3. The thickness $W_0$ for the waveguides 1, 2, and 3 is 250 nm, the width $W_1$ of the waveguide 1 is 250 nm, and each of the width $W_2$ of the waveguide 2 and the width $W_3$ of the waveguide 3 is 1 µm. The width $W_6$ for the partially narrowed portion of the waveguide 2 is 500 nm. The gap s between the waveguides 1 and 2 is 100 nm and the length $L_1$ for the portion where the waveguides 1 and 2 are in parallel is 40 µm. The spot diameter of the incident light is 2 µm in the direction x, and 1 µm in the direction y. As shown in the drawing, the light coupled to the waveguide 2 is coupled efficiently to the waveguide 1. The coupling efficiency from the waveguide 2 to the waveguide 1 is about 95%. The optical power at the exit of the waveguide 1 is 65% of the incident optical power.

Figure 23:
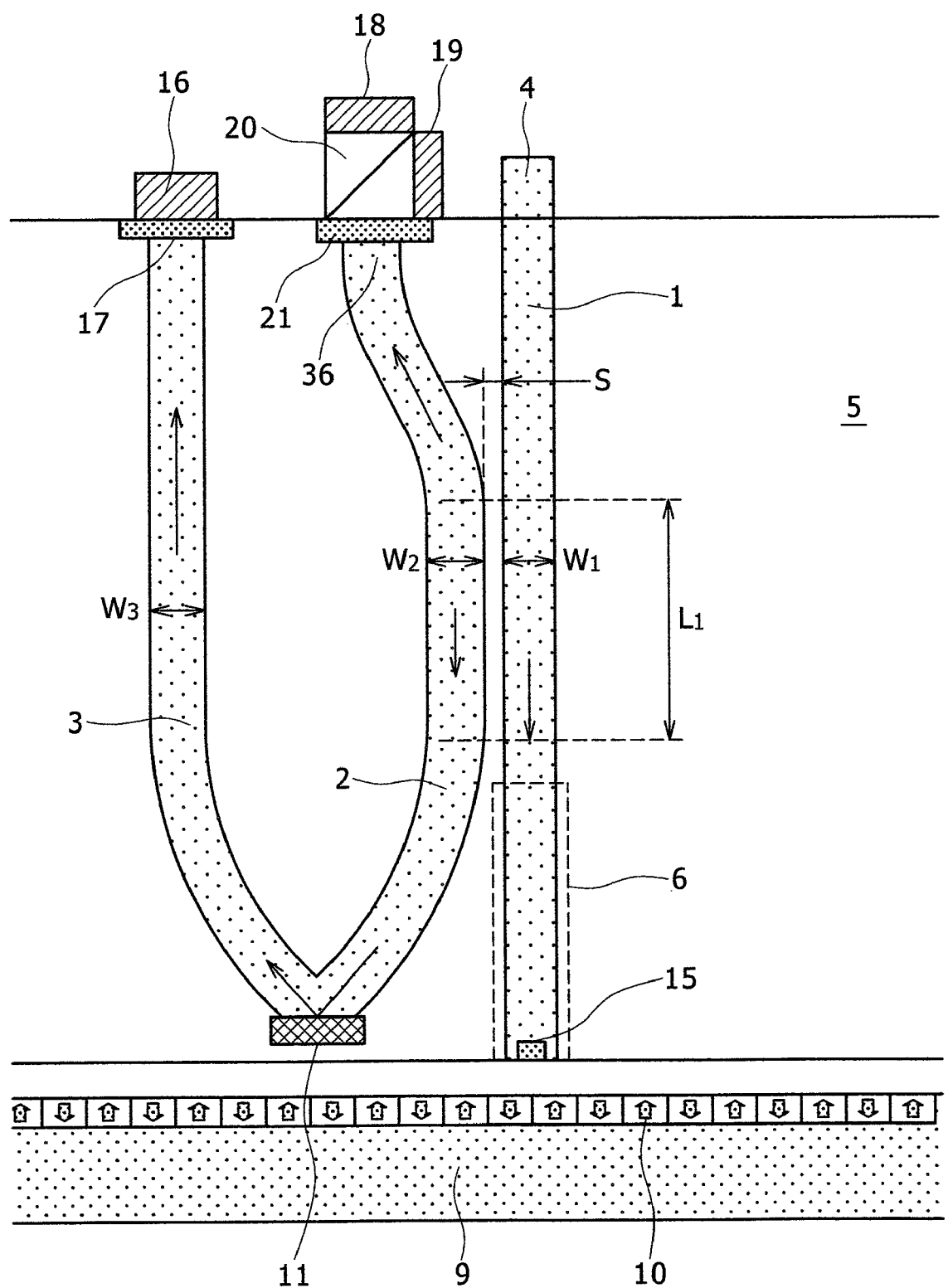
FIG. 23 is a view showing the case of disposing an optical system for optical reading according to the first embodiment.

In the first and the second embodiments described above, while a magnetic reading device is utilized for reading the data recorded on the medium, the data may be read by utilizing light instead of utilizing the magnetic reading device. FIG. 23 shows the arrangement for the optical reading. When near-field light generated by an optical near-field generator 15 interacts with a recording layer 10 on the surface of a medium 9, scattering light is generated. The direction of the polarization of the scattering light changes depending on the direction of the magnetization in the recording layer 10 by a Kerr effect. The scattering light proceeds upward in the waveguide 1 and proceeds to the end 36 on the inlet of the waveguide 2. The end 36 on the inlet of the waveguide 2 is extended as far as the upper surface of the slider and the scattering light is detected by optical reading photodiodes 18, 19 placed thereon. For detecting the rotation of the polarization light, light emitted from the end 36 on the inlet of the waveguide 2 is passed through a polarization beam splitter 20 thereby being separated into two polarization direction components perpendicular to each other. The separated light is detected respectively by the reading photodiodes 18, 19. In this case, a ½ wave plate 21 is disposed below the polarization beam splitter 20 and the direction of the ½ wave plate 21 is adjusted so as to make the magnitude of the reading signal maximum. Alternatively, it may also be adjusted to change the direction of the polarization beam splitter 20 so as to maximize the magnitude of the read signal maximum, instead of disposing the ½ wave plate 21.

As described above, in a case of reading the recorded data by detecting the scattering light through the waveguide 2, the efficiency (η) of the light in the waveguide 1 coupling to the waveguide 2 may not necessarily be 33% or less as described above. If the coupling efficiency (η) is excessively low, the coupling efficiency of the scattering light to the waveguide 2 is lowered to increase the S/N ratio of the detection signal. It is desirable that the coupling efficiency is 50%.

Further, in the magnetic recording apparatus described above, while a magnetic disc is utilized as the medium, a phase change medium or a photochromic medium may be also utilized instead of the magnetic disk. In this case, recording bits may be read by detecting the change of the intensity of the scattering light generated from the surface of the medium. Accordingly, it is not necessary to separate the scattering light by the polarization beam splitter 20, and the light emitting from the end 36 on the inlet of the waveguide 2 may be detected by one photodiode. In a case of utilizing a medium other than the magnetic recording medium such as the phase change medium or the photochromic medium, it is not necessary to dispose devices for applying magnetic fields such as coils 8 or the main pole 6 to the vicinity of the waveguide 1.

Figure 24:
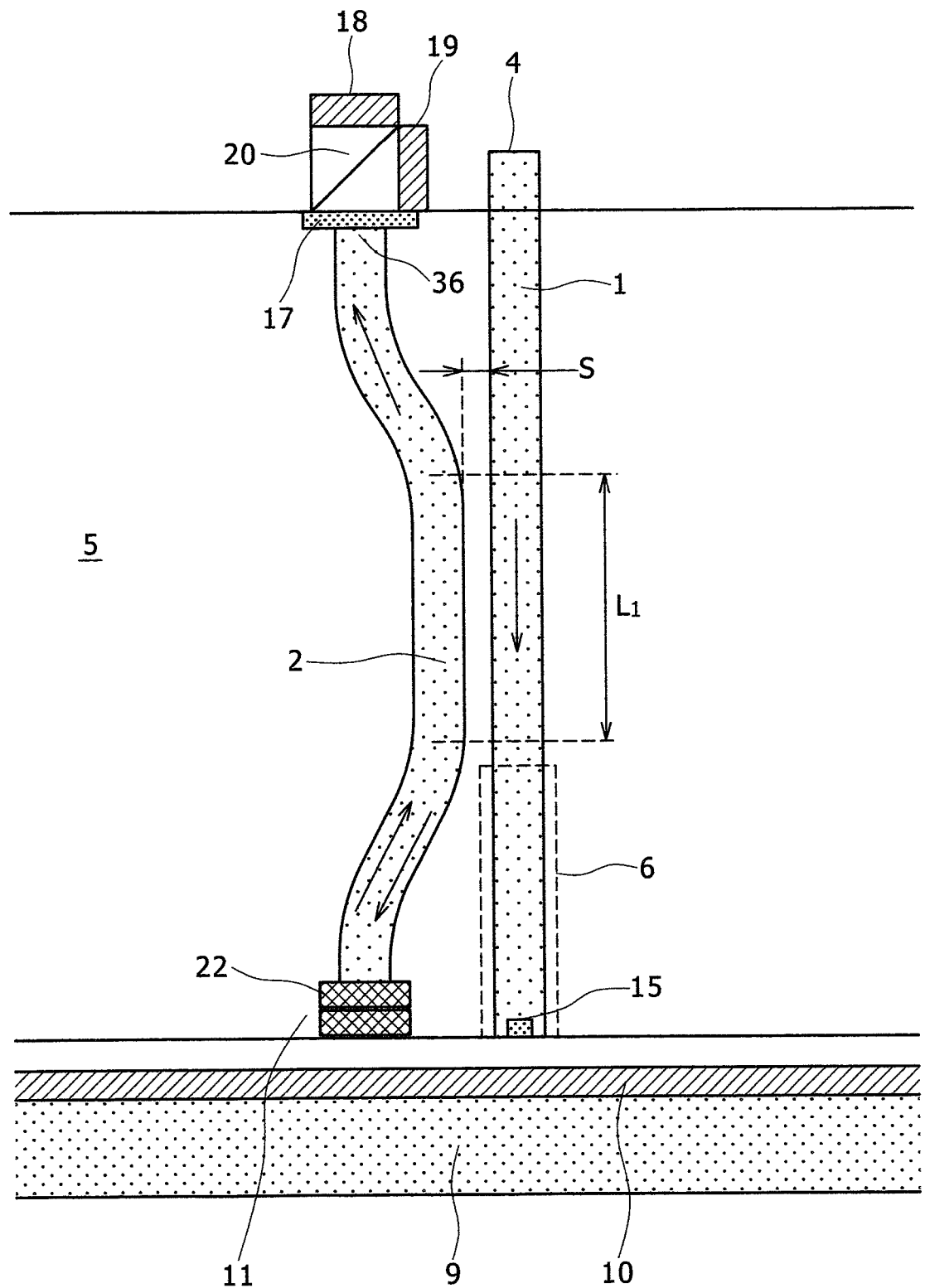
FIG. 24 is a view showing a case of disposing a reflection film to the lower portion of the second waveguide and detecting the light on the inlet of the second waveguide according to the first embodiment.

FIG. 24 shows a case of detecting the intensity change of scattering light generated from the medium surface at the end 36 on the inlet of a waveguide 2 and, at the same time, detecting the intensity of light propagating in a waveguide 1 at an identical position. In this case, light that is coupled from the waveguide 1 to the waveguide 2 and proceeds downward is turned back by a reflection mirror 11 causing it to proceed upward in the waveguide 2. In this case, by positioning a ¼ wave plate 22 before reflection mirror 11, the polarization direction can be rotated by 90°. A polarization beam splitter 20 is disposed at the end 36 on the inlet of the waveguide 2 to separate the light into light polarized in the direction identical with the incident light and light polarized in the direction perpendicular to the incident light. The light polarized in the direction identical with the incident light corresponds to the scattering light generated from the medium surface. Accordingly, recording bits can be read by detecting the light. On the other hand, the light polarized in the direction perpendicular to the incident light is light that has proceeded downward in the waveguide 2 and the intensity of light propagating in the waveguide 1 can be monitored by detecting the intensity of the light.

Figure 25:
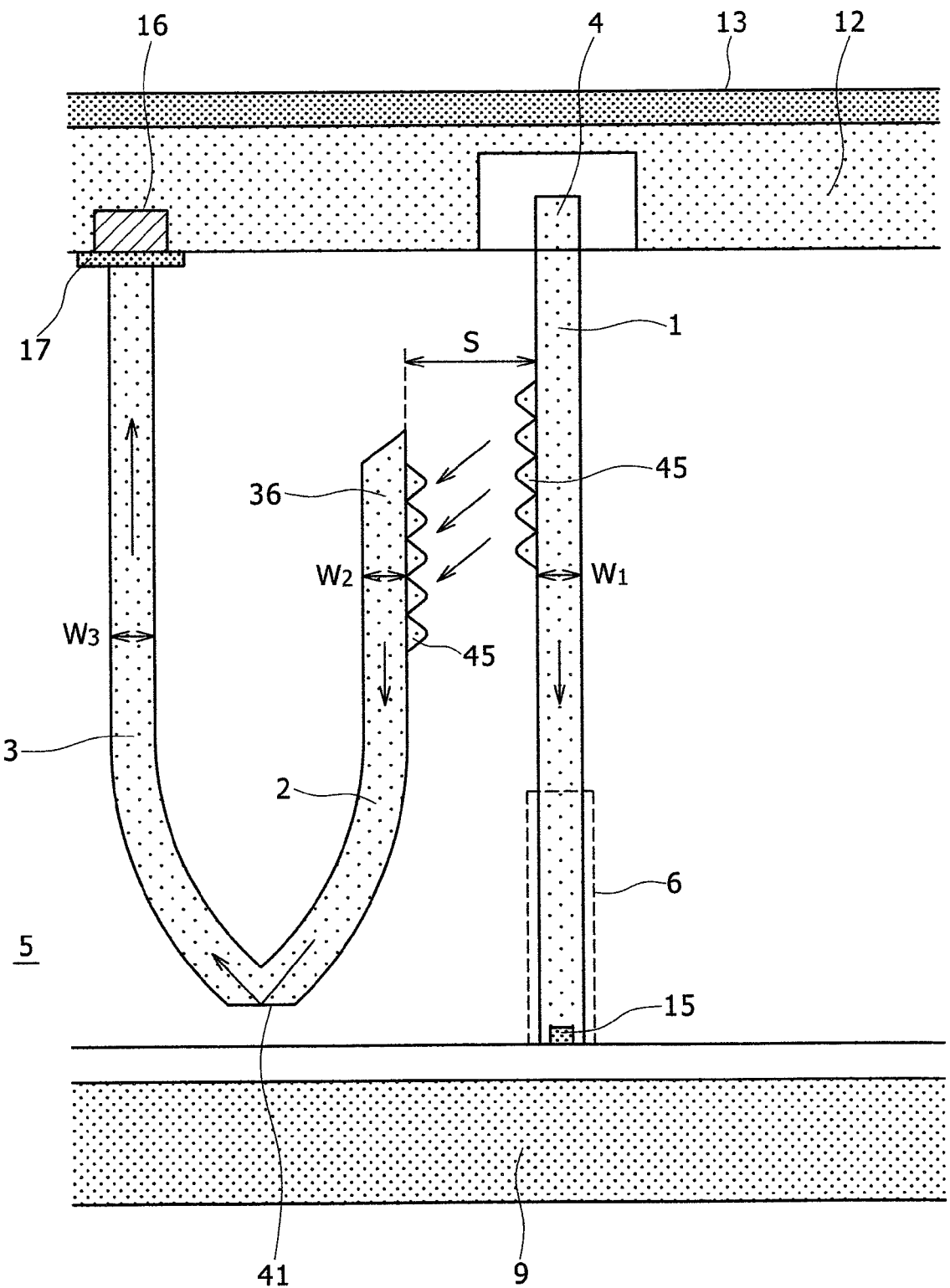
FIG. 25 is a view showing a structure of a waveguide of a thermally assisted magnetic recording head according to a third embodiment.
Figure 26:
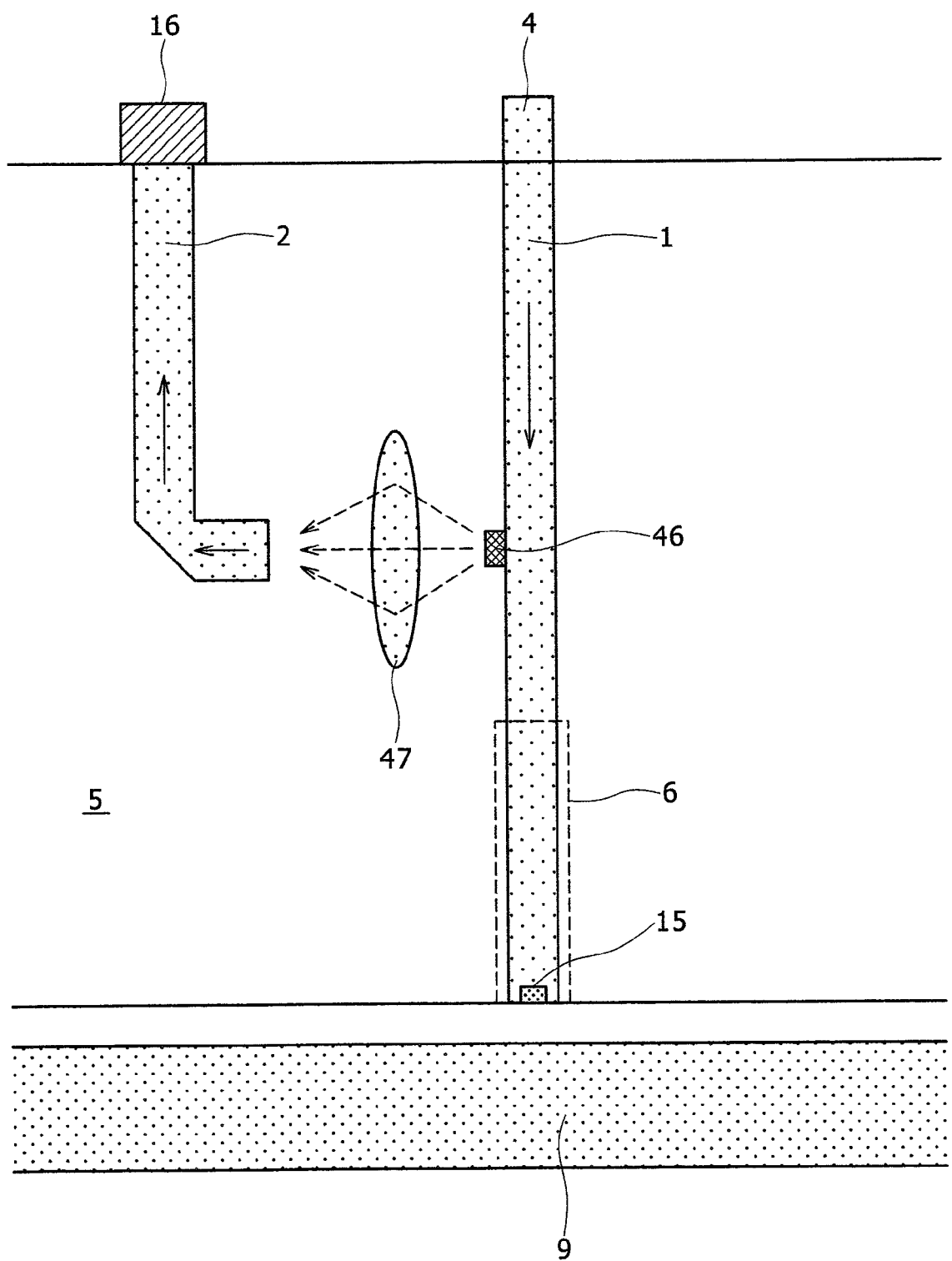
FIG. 26 is a view showing a modified example of a waveguide structure according to the third embodiment.

Then, the constitution of a third embodiment is to be described with reference to FIG. 25 and FIG. 26. In the first embodiment, while the evanescent light coupling is utilized for transferring the light from a waveguide 1 to a waveguide 2, coupling may be conducted by using a grating 45 instead of the evanescent light coupling as shown in FIG. 25. When the grating 45 is formed on the core surface of the waveguide 1, diffraction light is generated from the waveguide 1. The grating 45 is formed also on the waveguide 2 and the light diffracted from the waveguide 1 can be guided to the waveguide 2 by utilizing the grating 45 on the waveguide 2. Further, as shown in FIG. 26, a portion of the light transmitting in the waveguide 1 may be taken out by forming a scatterer 46 on the core surface of the waveguide 1 instead of the evanescent light coupling. As the scatterer 46, a metal piece or the like with a size of several 100 nm or less is utilized. Further, the light may also be scattered by preparing recesses or protrusions on the core surface of the waveguide 1 instead of forming the scatterer 46. The scattered light may be detected by a photodiode 16 placed on a slider by using a detection waveguide 2 placed near the waveguide 1. For improving an optical condensing efficiency, a lens 47 may be placed on the inlet of the waveguide 2 to optically condense the scattering light. The lens 47 may be a planar lens in order to facilitate fabrication.

Figure 27A:
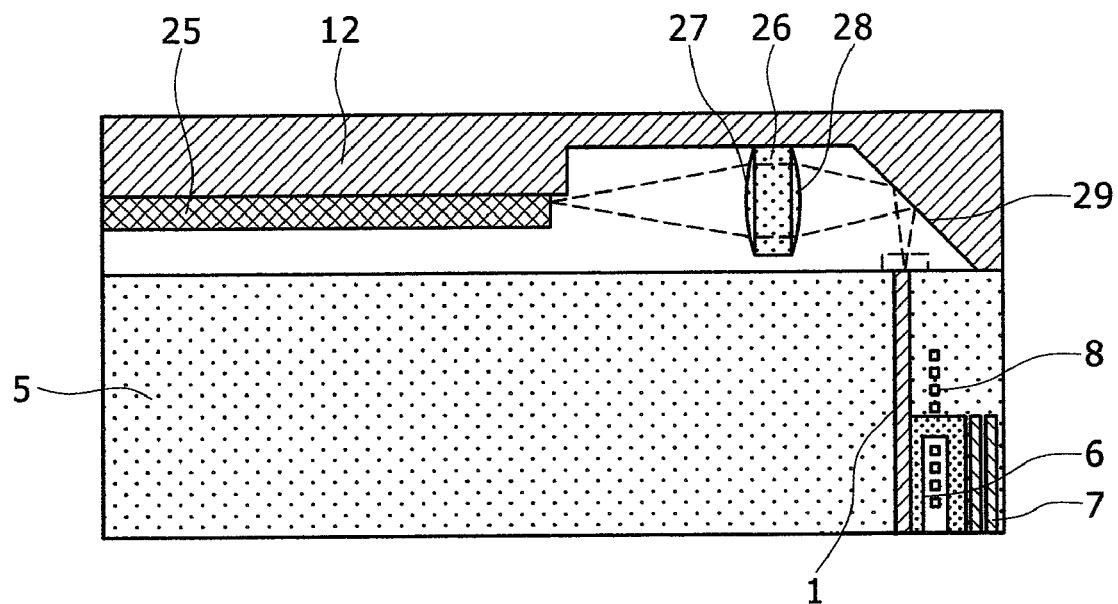
Figure 27B:
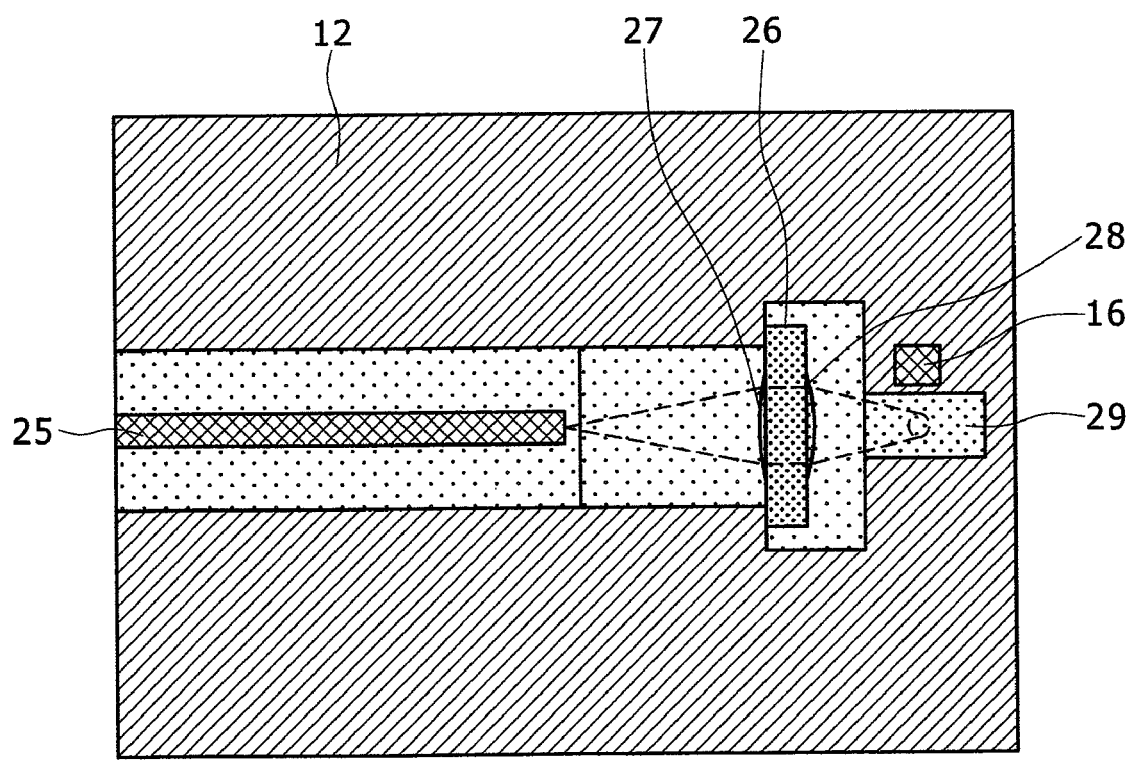

FIGS. 27A and 27B show a constitution of disposing a semiconductor laser 25 above a slider. FIG. 27A is a lateral cross sectional view and FIG. 27B is a view of an optical module including a semiconductor laser disposed on the slider as viewed from the back of the slider. The optical module disposed on the slider includes a mount 12 formed of Si, a semiconductor laser 25, micro-lenses 27 and 28, and reflection mirror 29. The semiconductor laser 25 is disposed in a recess formed to a central portion of the mount 12. The emission light from the semiconductor laser 25 is collimated by the micro-lens 27 and then condensed by the micro-lens 28. The micro-lenses 27 and 28 are formed on both sides of the transparent substrate 26. The light condensed by the micro-lens 28 is turned-back at the mirror 29. The mirror 29 is fabricated by cutting the mount 12 and coated at the surface thereof with a metal such as silver or aluminum. The photodiode 16 for detecting the light in the waveguide 1 is formed on the side of the mirror 29. The photodiode 16 can be fabricated directly to the surface of the mount 12 formed of Si. The positions for the semiconductor laser 25 and the micro-lenses 27 and 28 are adjusted such that the focal point of the light condensed by the micro-lens 28 situates at the incident port of the waveguide 1. In this case, the positioning in the direction parallel with the upper surface of the slider (directions x, y) is conducted while monitoring the output of the photodiode 16 in a state of actually lighting up the semiconductor laser 25. Since the optical power of the waveguide 1 is maximized when the condensing point of the laser aligns with the center of the waveguide 1, the output of the photodiode 16 is also maximized. Accordingly, the incident light and the waveguide 1 can be positioned at an extremely high accuracy by scanning the optical module or the slider for several μm while monitoring the output of the photodiode 16 after rough positioning, and fixing the optical module to the slider at a position where the output of the photodiode 16 reaches the maximum.

By the way, precise tracking is necessary for attaining the recording density near 1 Tb/in$^2$, which makes it preferable to dispose a micro actuator between a suspension and a slider. For decreasing the thickness of parts to be attached to the upper portion of the slider as small as possible, the substrate surface of the micro actuator (surface in contact with the slider) is partially cut out on which the semiconductor laser and the micro lenses are preferably disposed directly. Also the photodiode for light detection is preferably fabricated directly to the substrate surface of the micro actuator (face in contact with slider) (pn junction is fabricated directly to the substrate surface of the micro actuator).

Figure 28:
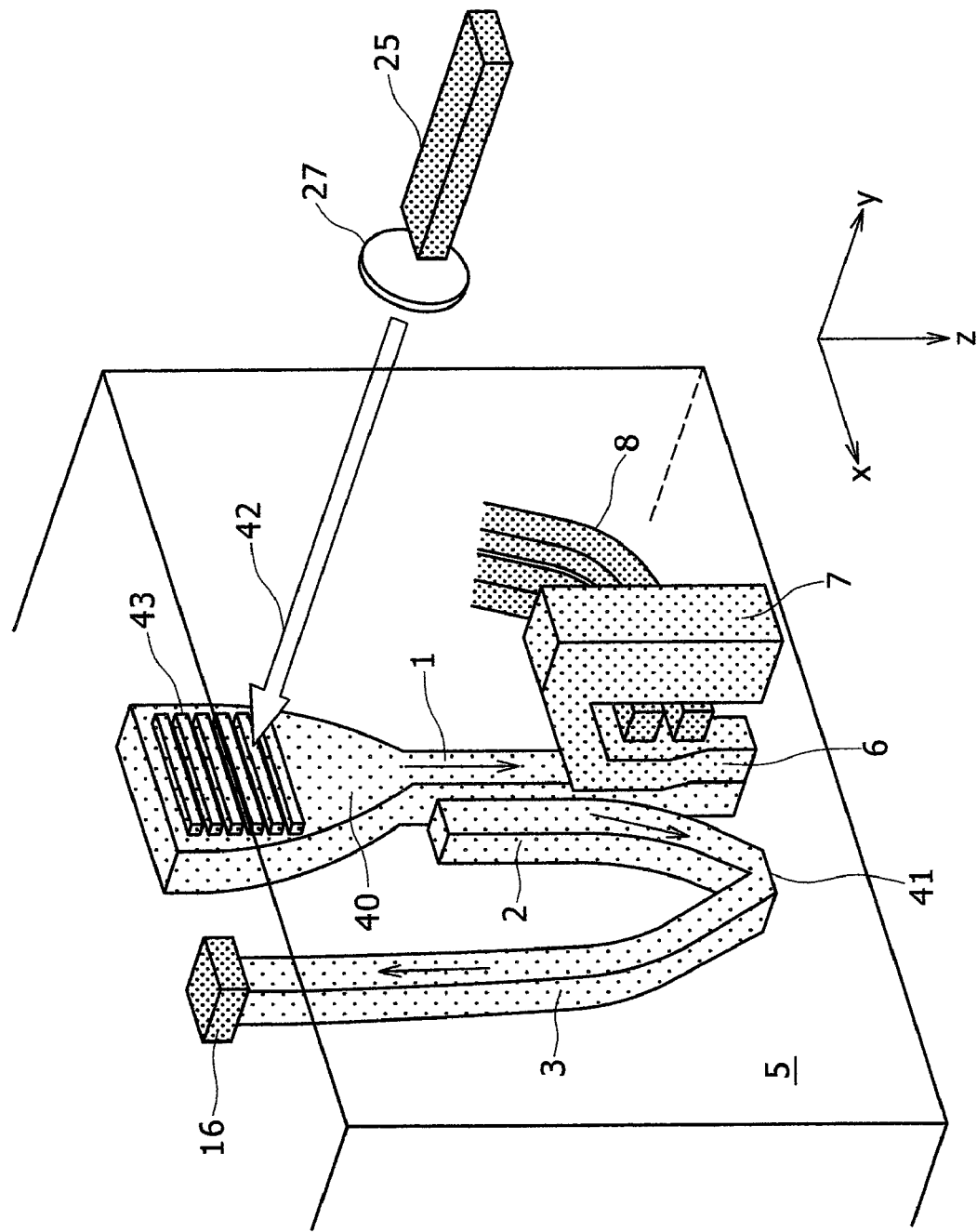
FIG. 28 is a view showing a modified example of the first embodiment in a case of coupling the light to the first waveguide using a grating.

FIG. 28 is a modified example of the first embodiment, which shows a constitution of using a grating for the incidence of light. A semiconductor laser 25 is disposed on a suspension or an arm, and light emitted from the semiconductor laser 25 is formed into parallel light 42 by a collimator lens 27. A tapered portion 40 is disposed to an upper portion of the waveguide 1, and a grating 43 is formed to the surface thereof for coupling the parallel light 42. In a case of coupling by using the grating 43 as described above, the coupling ratio of the incident light to the waveguide 1 (coupling efficiency) depends on the incident angle of light incident to the grating 43. Accordingly, when the slider or the suspension vibrates, since the direction of the light incident to the grating 43 is changed, the coupling efficiency to the waveguide 1 is changed. Further, since the coupling efficiency also depends on the wavelength, when the wavelength of the light of the semiconductor laser 25 fluctuates due to the temperature change or the like, the coupling efficiency fluctuates. When the coupling efficiency fluctuates changed as described above, the intensity of the light transmitting through the waveguide 1 fluctuates. For suppressing such fluctuation, like in the first embodiment, a portion of the light transmitting through the waveguide 1 is branched by a waveguide 2 and detected by a detector 16, a feedback loop is constituted by using the detection signal to control the intensity of the light transmitting through the waveguide 1 to be constant.

What is claimed is:

1. A thermally assisted magnetic recording head including a flying slider, a magnetic field generation device mounted on the flying slider, a first waveguide disposed near the magnetic field generation device for guiding incident light on a side of an air bearing surface of the flying slider, an optical near-field generator disposed at an emission end of the first waveguide, a second waveguide disposed to the first waveguide at a distance of a light wavelength or less, and a first optical detector for detecting the intensity of light propagating in the second waveguide, wherein a second photodetector is disposed at an end of the second waveguide situated in the direction opposite to a proceeding direction of light proceeding in the first waveguide, and scattering light generated by the scattering of near-field light generated from the optical near-field generator is detected by the second photodetector disposed at the end of the second waveguide.

* * * * *